(12) United States Patent
Nishikawa

(10) Patent No.: US 12,314,487 B2
(45) Date of Patent: May 27, 2025

(54) INFORMATION PROCESSING APPARATUS, DEVICE SPEED ESTIMATION METHOD, AND DEVICE POSITION ESTIMATION METHOD

(71) Applicant: SONY INTERACTIVE ENTERTAINMENT INC., Tokyo (JP)

(72) Inventor: Kenzo Nishikawa, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 18/727,671

(22) PCT Filed: Dec. 28, 2022

(86) PCT No.: PCT/JP2022/048494
§ 371 (c)(1),
(2) Date: Jul. 9, 2024

(87) PCT Pub. No.: WO2023/157498
PCT Pub. Date: Aug. 24, 2023

(65) Prior Publication Data
US 2025/0093972 A1    Mar. 20, 2025

(30) Foreign Application Priority Data

Feb. 18, 2022    (JP) ................................ 2022-023935

(51) Int. Cl.
*G06F 3/00* (2006.01)
*G01P 7/00* (2006.01)
(Continued)

(52) U.S. Cl.
CPC .............. *G06F 3/0346* (2013.01); *G01P 7/00* (2013.01); *G06T 7/73* (2017.01); *A63F 13/211* (2014.09);
(Continued)

(58) Field of Classification Search
CPC .......... G06F 3/011; G06F 3/012; G06F 3/014; G06F 3/0346; A63F 13/211; A63F 13/213; G06T 2207/30204; G06T 7/75
See application file for complete search history.

(56) References Cited

U.S. PATENT DOCUMENTS

| 2012/0200665 A1* | 8/2012 | Furumura ............. H04N 23/635 |
| | | 348/36 |
| 2013/0002923 A1* | 1/2013 | Kanma .................. G01C 17/28 |
| | | 348/333.02 |

FOREIGN PATENT DOCUMENTS

| JP | 2002040040 A | 2/2002 |
| JP | 2007278983 A | 10/2007 |

(Continued)

OTHER PUBLICATIONS

International Search Report for corresponding International Application No. PCT/JP2022/048494, dated Mar. 28, 2023, pp. 1-5.

*Primary Examiner* — Insa Sadio
(74) *Attorney, Agent, or Firm* — HEA Law PLLC

(57) ABSTRACT

A sensor data acquisition unit 214 acquires sensor data indicating an acceleration of a device including a vibrator. A second estimation processing unit 250 estimates a speed of the device on the basis of the sensor data. A vibration determination unit 262 determines whether or not the vibrator is vibrating on the basis of the sensor data. A stationary determination unit 264 determines whether or not the device is stationary on the basis of the sensor data. A second estimation processing unit 250 reduces the estimated speed of the device in a case where it is determined that the vibrator is vibrating and the device is stationary.

9 Claims, 16 Drawing Sheets

(51) Int. Cl.
*G06F 3/0346* (2013.01)
*G06T 7/73* (2017.01)
*A63F 13/211* (2014.01)
*A63F 13/213* (2014.01)
*A63F 13/285* (2014.01)

(52) U.S. Cl.
CPC .......... *A63F 13/213* (2014.09); *A63F 13/285* (2014.09); *G06T 2207/30204* (2013.01)

(56) References Cited

FOREIGN PATENT DOCUMENTS

| | | | |
|---|---|---|---|
| JP | 2020181322 A | 11/2020 | |
| JP | 2021060332 A | 4/2021 | |
| WO | WO-2021240930 A1 | 12/2021 | |

\* cited by examiner

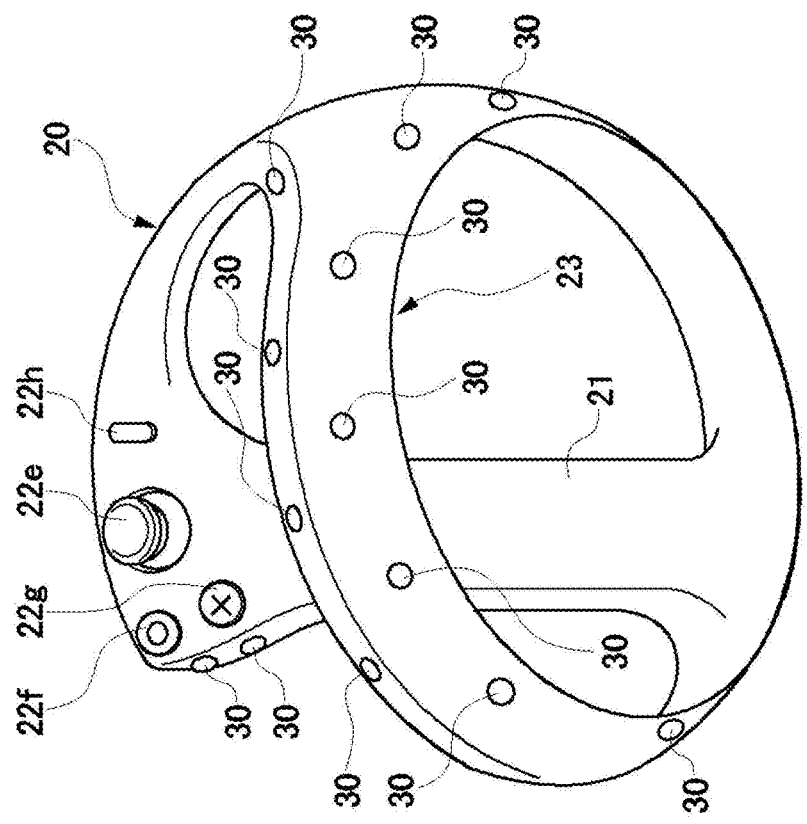
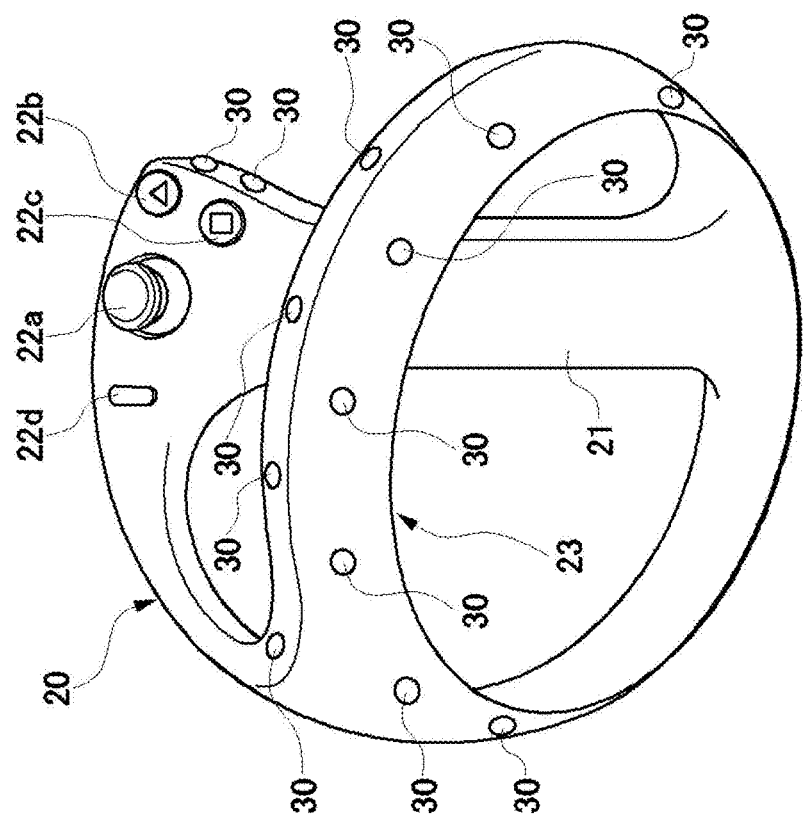
FIG. 4

14

FIG.13
(a) ACCELERATION
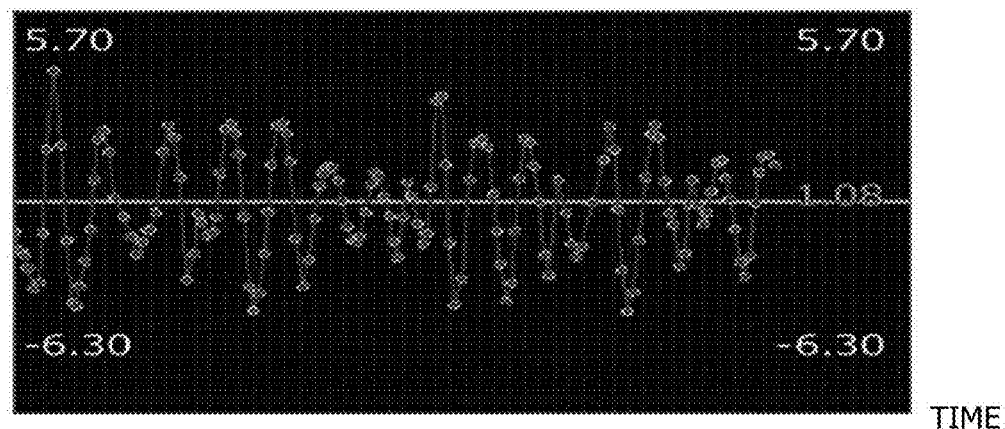
(b) ESTIMATED SPEED
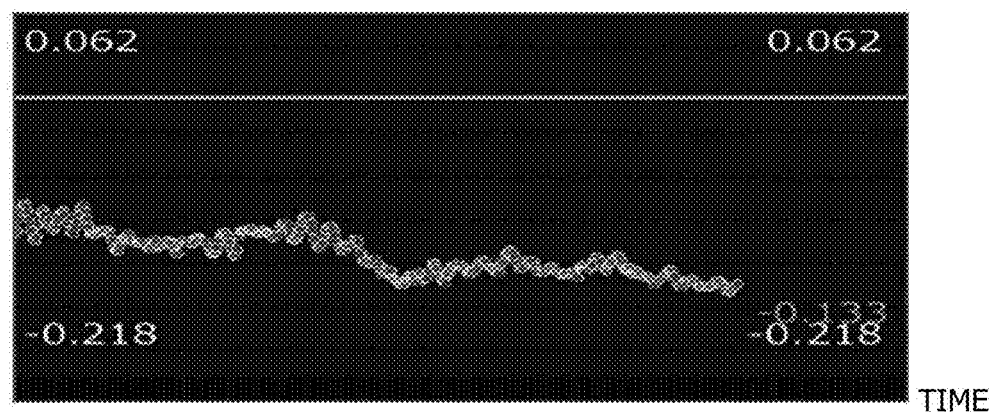
(c) ESTIMATED POSITION
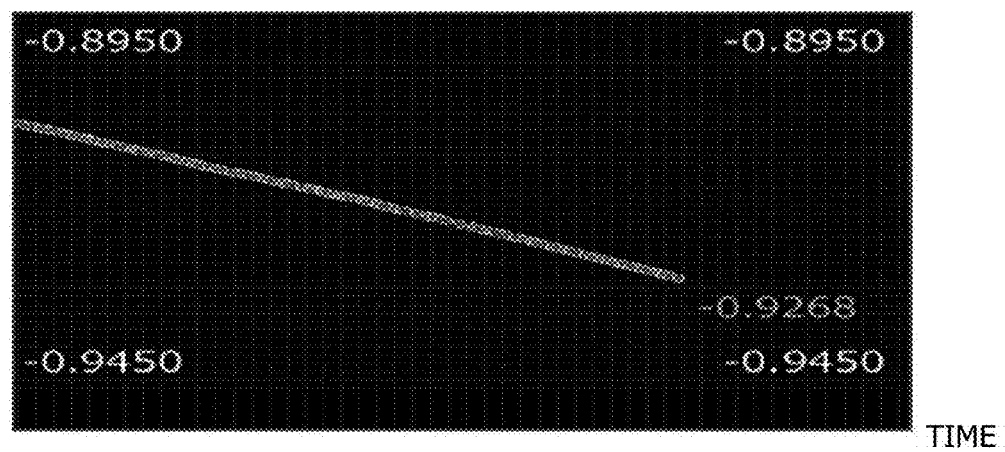

FIG.16
(a) ACCELERATION
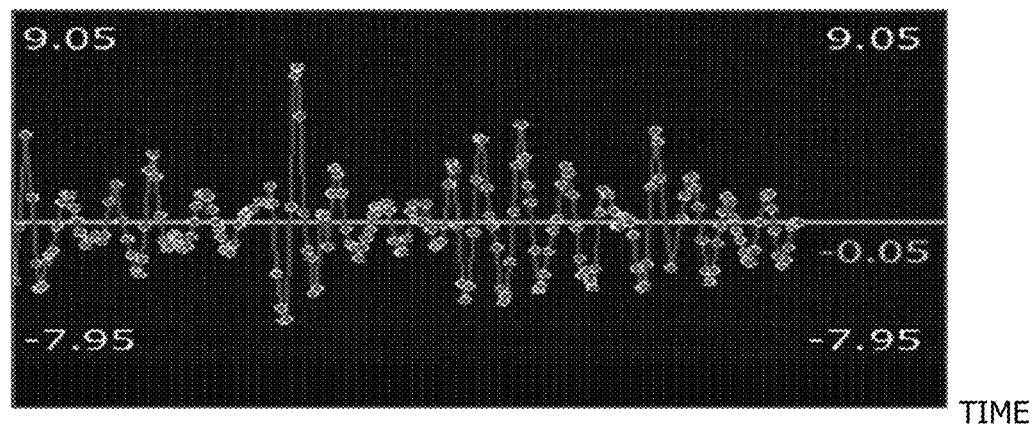
(b) ESTIMATED SPEED
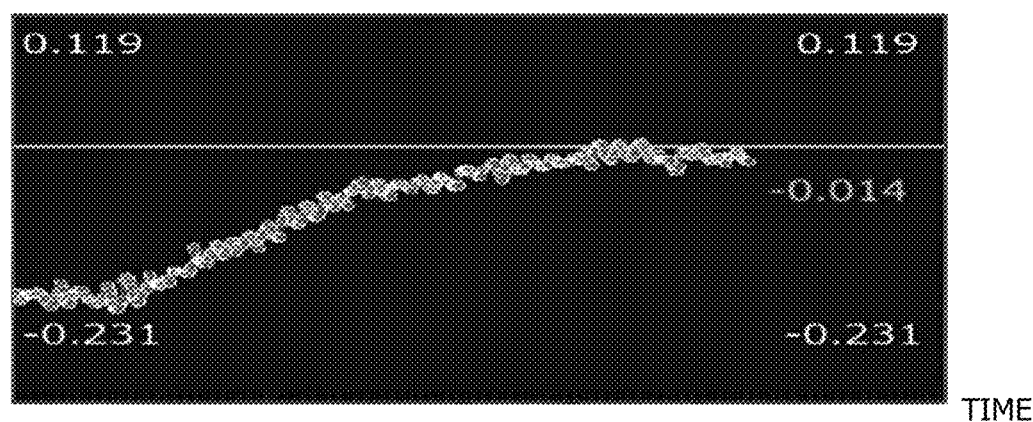
(c) ESTIMATED POSITION
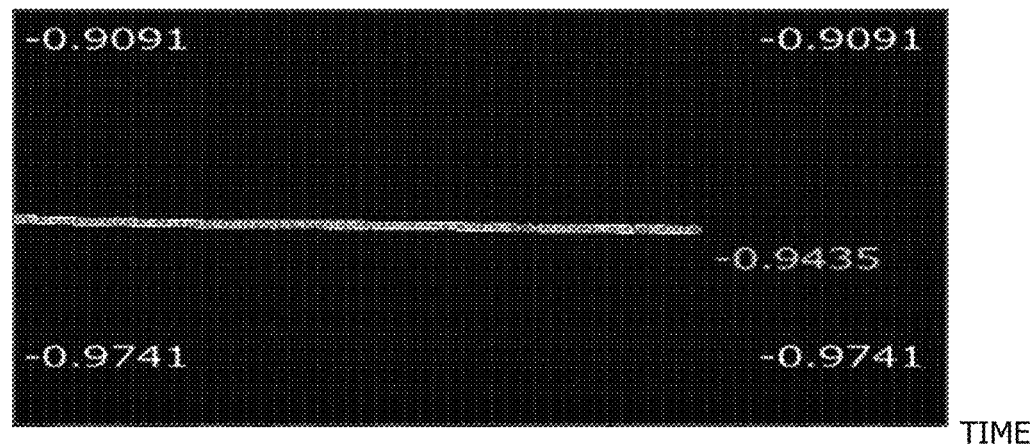

INFORMATION PROCESSING APPARATUS, DEVICE SPEED ESTIMATION METHOD, AND DEVICE POSITION ESTIMATION METHOD

CROSS REFERENCE TO RELATED APPLICATIONS

This application is a National Stage of International Application No. PCT/JP2022/048494 filed on Dec. 28, 2022, which claims priority from Japanese Patent Application 2022-023935, filed on Feb. 18, 2022. The contents of the above document is incorporated herein by reference in its entirety.

TECHNICAL FIELD

The present disclosure relates to a technique for estimating a speed and/or a position of a device including a vibrator.

BACKGROUND ART

PTL 1 discloses an information processing apparatus that specifies a representative coordinate of marker images from an image obtained by photographing a device including a plurality of markers and derives position information and posture information regarding the device by use of the representative coordinate of the marker images. The information processing apparatus disclosed in PTL 1 specifies a first boundary box surrounding a region in which pixels having a first luminance or higher are continuous in a photographed image, specifies a second boundary box surrounding a region in which pixels having a second luminance or higher, which is higher than the first luminance in the first boundary box, are continuous, and derives the representative coordinate of the marker images on the basis of the pixels in the first boundary box or the second boundary box.

PTL 2 discloses an input device provided with a plurality of light emission parts and a plurality of operation members. The light emission parts of the input device are photographed by a camera provided in a head-mounted device, and the position and posture of the input device are calculated on the basis of the positions of the detected light emission parts.

CITATION LIST

Patent Literature

[PTL 1]
Japanese Patent Laid-open No. 22020-181322
[PTL 2]
International Publication No. 2021/240930

SUMMARY

Technical Problem

In recent years, an information processing technique that tracks the position and posture of a device and reflects them in a three-dimensional (3D) model in a virtual reality (VR) space has spread. The movement of a player character or a game object in a game space is interlocked with a change in the position or posture of a device to be tracked, so that an intuitive operation by a user can be realized.

The tracking processing disclosed in PTL 1 is performed when the device is photographed by an imaging apparatus and the marker images are included in the photographed image. Therefore, if the device moves outside the angle of view of the imaging apparatus and the marker images are not included in the photographed mage, the tracking processing disclosed in PTL 1 cannot be performed.

Therefore, an object of the present disclosure is to provide a technique necessary for estimating a device position even in a case where the device is not photographed. It should be noted that the device may be an input device having an operation member, but may also be a device that is simply to be tracked without having an operation member.

Solution to Problem

In order to solve the above problem, an information processing apparatus according to an aspect of the present disclosure is an information processing apparatus that estimates a speed of a device including a vibrator, the apparatus including a sensor data acquisition unit that acquires sensor data indicating an acceleration of the device, an estimation processing unit that estimates the speed of the device on the basis of the sensor data; a vibration determination unit that determines whether or not the vibrator is vibrating on the basis of the sensor data, and a stationary determination unit that determines whether or not the device is stationary on the basis of the sensor data. In a case where it is determined that the vibrator is vibrating and the device is stationary, the estimation processing unit reduces the estimated speed of the device.

An information processing apparatus according to another aspect of the present disclosure is an information processing apparatus that estimates a position of a device including a vibrator, the apparatus including a photographed image acquisition unit that acquires an image obtained by photographing the device, a first estimation processing unit that estimates the position of the device on the basis of the image obtained by photographing the device, a sensor data acquisition unit that acquires sensor data indicating an acceleration of the device, a second estimation processing unit that estimates a speed and the position of the device on the basis of the sensor data, a third estimation processing unit that derives the position of the device on the basis of the position of the device estimated by the first estimation processing unit and the position of the device estimated by the second estimation processing unit; a vibration determination unit that determines whether or not the vibrator is vibrating on the basis of the sensor data, and a stationary determination unit that determines whether or not the device is stationary on the basis of the sensor data. In a case where it is determined that the vibrator is vibrating and the device is stationary, the second estimation processing unit reduces the estimated speed of the device.

A device position estimation method according to still another aspect of the present disclosure is a method for estimating a speed of a device including a vibrator, the method including a step of acquiring sensor data indicating an acceleration of the device, a step of estimating the speed of the device on the basis of the sensor data, a step of determining whether or not the vibrator is vibrating on the basis of the sensor data, a step of determining whether or not the device is stationary on the basis of the sensor data, and a step of reducing the estimated speed of the device in a case where it is determined that the vibrator is vibrating and the device is stationary.

A device position estimation method according to still another aspect of the present disclosure is a method for estimating a position of a device including a vibrator, the method including a step of acquiring an image photographed by an imaging apparatus, a first estimation step of estimating the position of the device on the basis of an image obtained by photographing the device by the imaging apparatus, a step of acquiring sensor data indicating an acceleration of the device, a second estimation step of estimating a speed and the position of the device on the basis of the sensor data, a third estimation step of estimating the position of the device on the basis of the position of the device estimated in the first estimation step and the position of the device estimated in the second estimation step, a step of determining whether or not the vibrator is vibrating on the basis of the sensor data, a step of determining whether or not the device is stationary on the basis of the sensor data, and a step of reducing the speed of the device estimated in the second estimation step in a case where it is determined that the vibrator is vibrating and the device is stationary.

It should be noted that any combination of the above constitutional elements and an expression obtained by converting the expression of the present disclosure between methods, apparatuses, systems, computer programs, recording media that record computer programs in a readable manner, data structures, and the like are also effective as an aspect of the present disclosure.

BRIEF DESCRIPTION OF DRAWINGS

FIG. 4 depicts diagrams each depicting a shape of an input device.

FIG. 13 depicts diagrams for depicting time series data of an acceleration, a change in estimated speed, and a change in estimated position.

FIG. 16 depicts diagrams for depicting time series data of the acceleration, a change in estimated speed, and a change in estimated position.

DESCRIPTION OF EMBODIMENT

Figure 1:
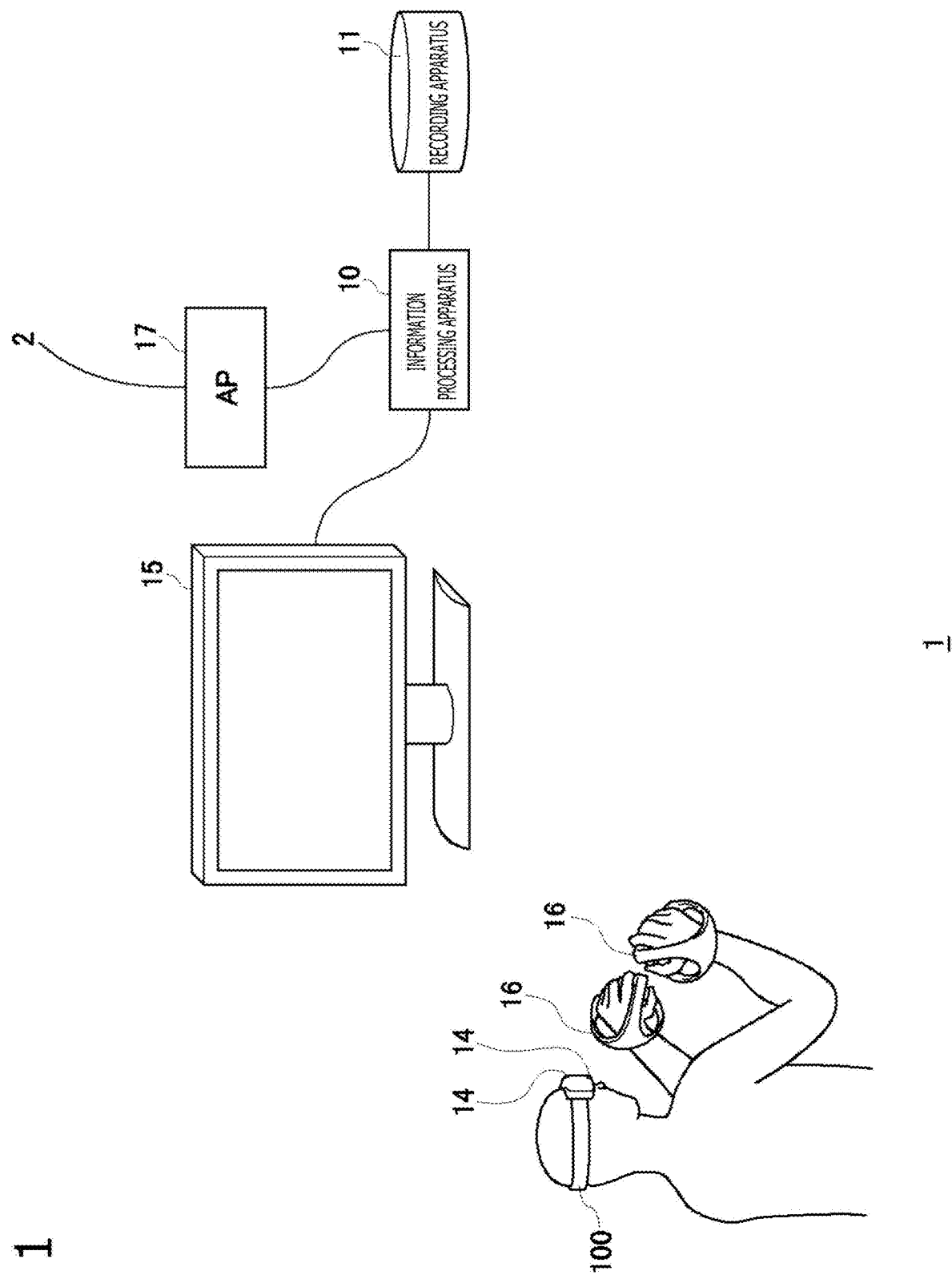
FIG. 1 is a diagram for depicting a configuration example of an information processing system in an embodiment.

FIG. 1 depicts a configuration example of an information processing system 1 in an embodiment. The information processing system 1 includes an information processing apparatus 10, a recording apparatus 11, a head-mounted display (HMD) 100, input devices 16 held by a user and operated with hands and fingers, and an output apparatus 15 for outputting images and sounds. The output apparatus 15 may be a television. The information processing apparatus 10 is connected to an external network 2 such as the Internet via an access point (AP) 17. The AP 17 has functions as a wireless access point and a router, and the information processing apparatus 10 may be connected to the AP 17 by a cable or by a known wireless communication protocol.

The recording apparatus 11 records system software and applications such as game software. The information processing apparatus 10 may download game software from a content server to the recording apparatus 11 via the network 2. The information processing apparatus 10 executes the game software to supply image data and sound data of the game to the HMD 100. The information processing apparatus 10 and the HMD 100 may be connected to each other by a known wireless communication protocol or by a cable.

The HMD 100 is a display device for displaying an image on a display panel positioned in front of the eyes by being worn on the head of the user. The HMD 100 separately displays an image for the left eye on a display panel for the left eye and an image for the right eye on a display panel for the right eye. These images configure parallax images viewed from the left and right viewpoints and realize stereoscopic vision. Since the user views the display panel through an optical lens, the information processing apparatus 10 supplies parallax image data obtained by correcting optical distortion caused by the lens to the HMD 100.

Although the output apparatus 15 is not required for the user wearing the HMD 100, another user can view the display image of the output apparatus 15 by preparing the output apparatus 15. The information processing apparatus 10 may cause the output apparatus 15 to display the same image as that viewed by the user wearing the HMD 100, but another image may be displayed. For example, in a case where the user wearing the HMD and another user play a game together, the output apparatus 15 may display a game image from the character viewpoint of the other user.

The information processing apparatus 10 and the input devices 16 may be connected to each other by a known wireless communication protocol or by a cable. The input devices 16 include a plurality of operation members such as operation buttons, and the user operates the operation members with the hands and fingers while gripping the input devices 16. When the information processing apparatus 10 executes a game, the input devices 16 are used as a game controller. The input devices 16 are each provided with an inertial measurement unit (IMU) including a 3-axis acceleration sensor and a 3-axis angular speed sensor, and transmits sensor data to the information processing apparatus 10 at a predetermined cycle (for example, 800 Hz).

In a game of the embodiment, not only operation information regarding the operation members of the input devices 16, but also the speeds, the positions, the postures, and the like of the input devices 16 are treated as the operation information and reflected in the movement of a player character in a virtual three-dimensional space. For example, the operation information regarding the operation members may be used as information for moving the player character, and the operation information such as the speeds, the positions, the postures, and the like of the input devices 16 may be used as information for moving the arms of the player character. In a battle scene in a game, the movements of the input devices 16 are reflected in the movement of the player character holding a weapon, so that an intuitive operation of the user can be realized and a sense of immersion in the game can be enhanced.

In order to track the positions and the postures of the input devices 16, the input devices 16 are provided with a plurality of markers (light emission parts) that can be photographed by imaging apparatuses 14. The information processing apparatus 10 includes a function (hereinafter, also referred to as a "first estimation function") for estimating the positions and the postures of the input devices 16 in a real space by analyzing an image obtained by photographing the input devices 16.

The HMD 100 is equipped with a plurality of imaging apparatuses 14. The plurality of imaging apparatuses 14 are attached to different positions on the front surface of the HMD 100 with different postures such that the entire photographing range obtained by adding the respective photographing ranges to each other includes the entire field of view of the user. The imaging apparatuses 14 include image sensors capable of acquiring images of the plurality of markers of the input devices 16. For example, in a case where the markers emit visible light, the imaging apparatuses 14 have visible light sensors used in a general digital video camera such as CCD (Charge Coupled Device) sensors and CMOS (Complementary Metal Oxide Semiconductor) sensors. In a case where the markers emit non-visible light, the imaging apparatuses 14 have non-visible light sensor. The plurality of imaging apparatuses 14 photograph the front of the user at a predetermined cycle (for example, 120 frames per second) at the synchronized timing, and transmit image data obtained by photographing a real space to the information processing apparatus 10.

The information processing apparatus 10 performs the first estimation function to specify the positions of the plurality of marker images of the input devices 16 included in the photographed image. It should be noted that one input device 16 may be photographed by the plurality of imaging apparatuses 14 at the same timing, but since the attachment positions and the attachment postures of the imaging apparatuses 14 are known, the information processing apparatus 10 may combine a plurality of photographed images to specify the positions of the marker images.

The three-dimensional shapes of the input devices 16 and the position coordinates of the plurality of markers arranged on the surface thereof are known, and the information processing apparatus 10 estimates the positions and the postures of the input devices 16 in a real space on the basis of the position coordinates of the plurality of marker images in the photographed image. The positions of the input devices 16 are estimated as world coordinate values in a three-dimensional space with the reference position as the origin, and the reference position may be a position coordinate (a latitude, a longitude, and an altitude (elevation)) set before the start of the game.

The information processing apparatus 10 of the embodiment includes a function (hereinafter, also referred to as a "second estimation function") for estimating the speeds, the positions, and the postures of the input devices 16 in a real space by analyzing the sensor data transmitted from the input devices 16. The information processing apparatus 10 derives the positions and the postures of the input devices 16 by using the estimation result by the first estimation function and the estimation result by the second estimation function.

The information processing apparatus 10 of the embodiment uses a state estimation technique using a Kalman filter to integrate the estimation result by the first estimation function and the estimation result by the second estimation function, so that the states of the input devices 16 at the current time are estimated with high accuracy.

Figure 2:
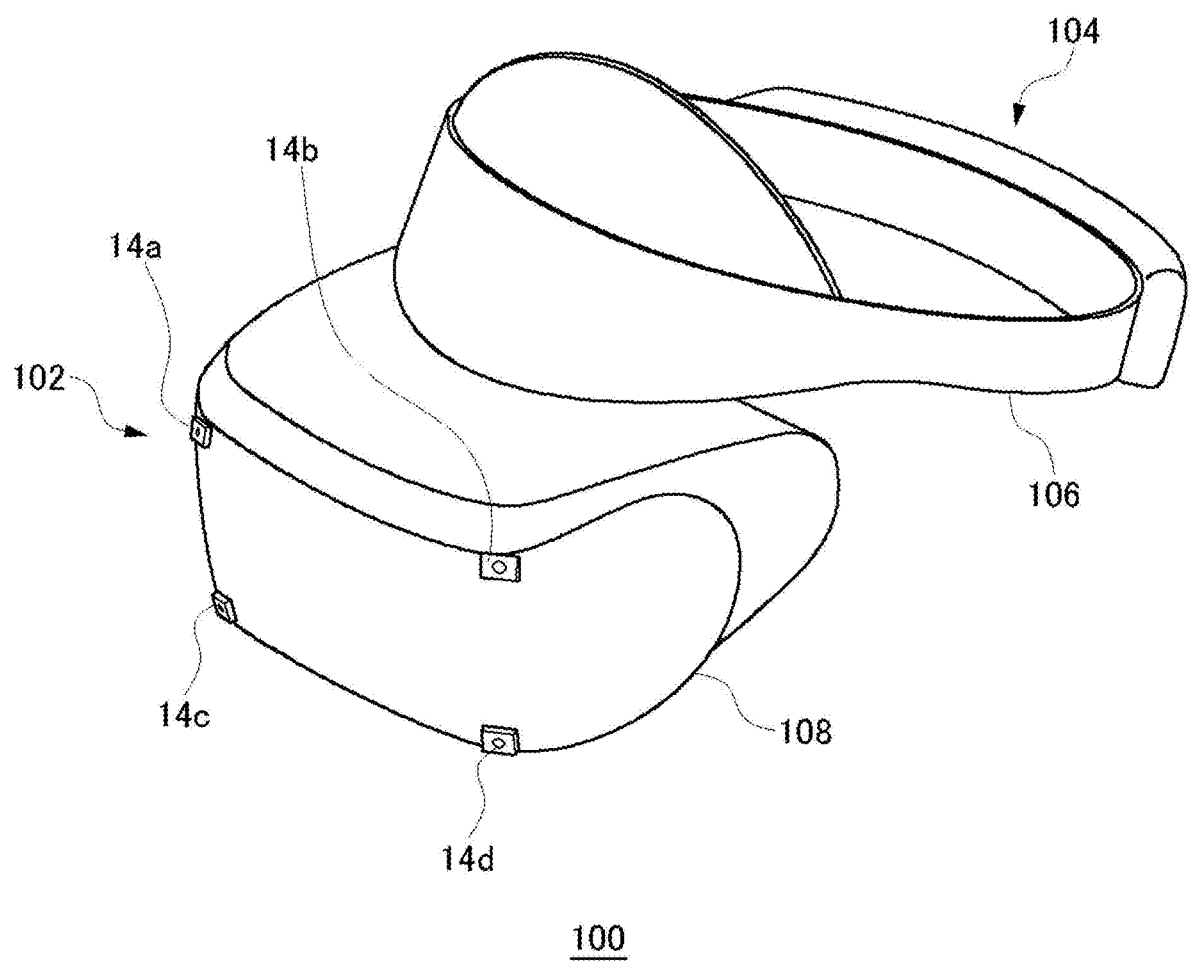
FIG. 2 is a diagram for depicting an example of an appearance shape of a head-mounted display (HMD).

FIG. 2 depicts an example of the appearance shape of the HMD 100. The HMD 100 is configured with an output mechanism unit 102 and a wearing mechanism unit 104. The wearing mechanism unit 104 includes a wearing band 106 that goes around the head by being worn by the user to fix the HMD 100 to the head. The wearing band 106 has a material or a structure whose length can be adjusted according to the head circumference of the user.

The output mechanism unit 102 includes a housing 108 in a shape covering the left and right eyes in a state where the user wears the HMD 100, and includes therein a display panel facing the eyes at the time of wearing. The display panel may be a liquid crystal panel, an organic electroluminescence (EL) panel, or the like. A pair of left and right optical lenses positioned between the display panel and the eyes of the user to enlarge the viewing angle of the user are further provided inside the housing 108. The HMD 100 may further include speakers or earphones at positions corresponding to the ears of the user and may be configured such that external headphones are connected.

A plurality of imaging apparatuses 14a, 14b, 14c, and 14d are provided on the front outer surface of the housing 108. With the front direction of the face of the user used as a reference, the imaging apparatus 14a is attached to an upper right corner of the front outer surface such that a camera optical axis is directed diagonally in an upper right direction, the imaging apparatus 14b is attached to an upper left corner of the front outer surface such that the camera optical axis is directed diagonally in an upper left direction, the imaging apparatus 14c is attached to a lower right corner of the front outer surface such that the camera optical axis is directed diagonally in a lower right direction, and the imaging apparatus 14d is attached to a lower left corner of the front outer surface such that the camera optical axis is directed diagonally in a lower left direction. By installing the plurality of imaging apparatuses 14 in this manner, the entire photographing range obtained by adding the respective photographing ranges to each other includes the entire field of view of the user. The field of view of the user may be the field of view of the user in a three-dimensional virtual space.

The HMD 100 transmits sensor data detected by an IMU (inertial measurement unit) and image data photographed by the imaging apparatuses 14 to the information processing apparatus 10, and receives game image data and game sound data generated by the information processing apparatus 10.

Figure 3:
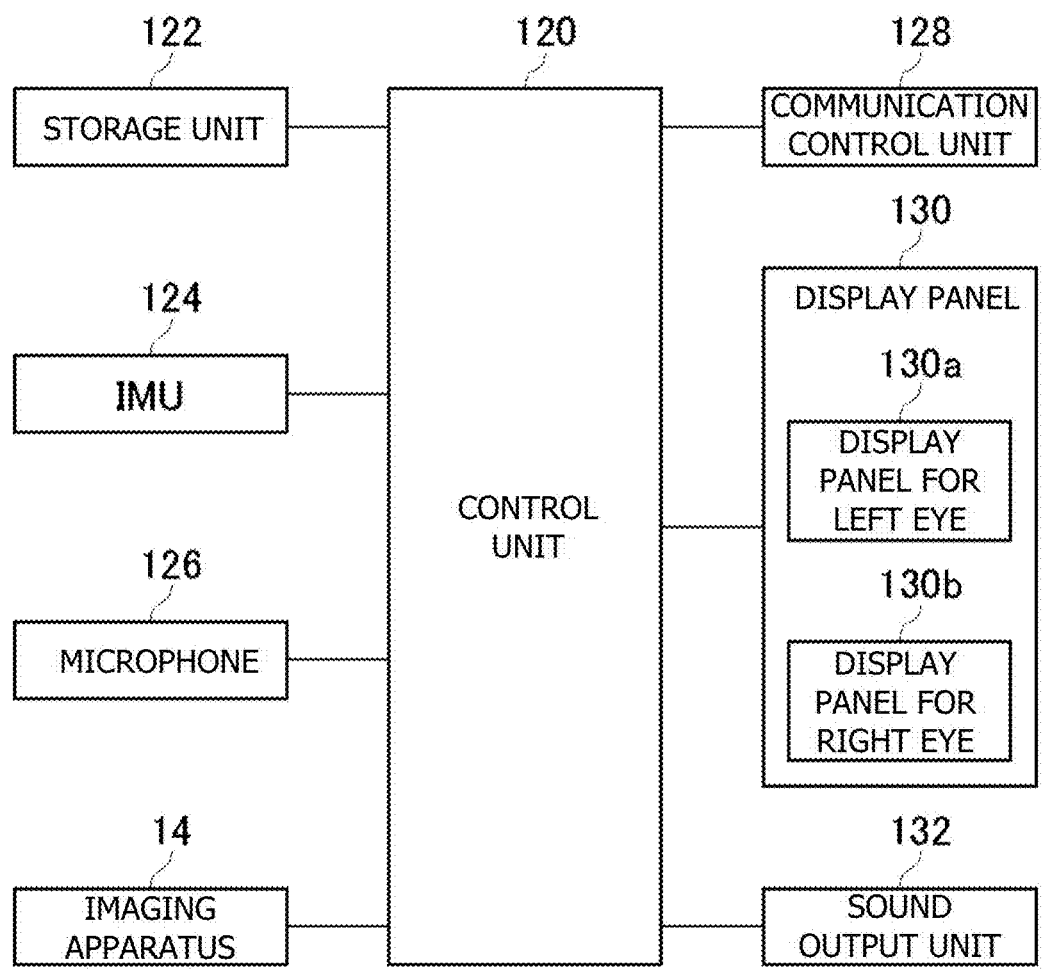
FIG. 3 is a diagram for depicting functional blocks of the HMD.

FIG. 3 depicts functional blocks of the HMD 100. A control unit 120 is a main processor that processes and outputs various types of data such as image data, sound data, and sensor data, and commands. A storage unit 122 temporarily stores data, commands, and the like to be processed by the control unit 120. An IMU 124 acquires sensor data related to the movement of the HMD 100. The IMU 124 may include at least a 3-axis acceleration sensor and a 3-axis angular speed sensor. The IMU 124 detects the value (sensor data) of each axis component at a predetermined cycle (for example, 800 Hz).

A communication control unit 128 transmits data output from the control unit 120 to the external information processing apparatus 10 by wired or wireless communication via a network adapter or an antenna. In addition, the communication control unit 128 receives data from the information processing apparatus 10 and outputs the data to the control unit 120.

When receiving the game image data and the game sound data from the information processing apparatus 10, the control unit 120 supplies them to a display panel 130 for display, and also supplies them to a sound output unit 132 to output sounds. The display panel 130 is configured with a display panel 130a for the left eye and a display panel 130b for the right eye, and a pair of parallax images are displayed on each display panel. In addition, the control unit 120 transmits the sensor data from the IMU 124, the sound data from a microphone 126, and the photographed image data from the imaging apparatuses 14 to the information processing apparatus 10 from the communication control unit 128.

FIG. 4(a) depicts the shape of an input device 16a for the left hand. The input device 16a for the left hand includes a case body 20, a plurality of operation members 22a, 22b, 22c, and 22d (hereinafter, referred to as an "operation member 22" when they are not particularly distinguished from each other) operated by the user, and a plurality of markers 30 for emitting light to the outside of the case body 20. The markers 30 may have emission parts having a circular cross section. The operation member 22 may include an analog stick for tilting operation, a press button, and the like. The case body 20 has a gripping part 21 and a curved part 23 connecting the head of the case body and the bottom of the case body to each other, and the user puts the left hand into the curved part 23 to grip the gripping part 21. The user operates the operation members 22a, 22b, 22c, and 22d by using the thumb of the left hand in a state of gripping the gripping part 21.

FIG. 4(b) depicts the shape of an input device 16b for the right hand. The input device 16b for the right hand includes a case body 20, a plurality of operation members 22e, 22f, 22g, and 22h (hereinafter, referred to as the "operation member 22" when they are not particularly distinguished from each other) operated by the user, and a plurality of markers 30 for emitting light to the outside of the case body 20. The operation member 22 may include an analog stick for tilting operation, a press button, and the like. The case body 20 has a gripping part 21 and a curved part 23 connecting the head of the case body and the bottom of the case body to each other, and the user puts the right hand into the curved part 23 to grip the gripping part 21. The user operates the operation members 22e, 22f, 22g, and 22h by using the thumb of the right hand in a state of gripping the gripping part 21.

Figure 5:
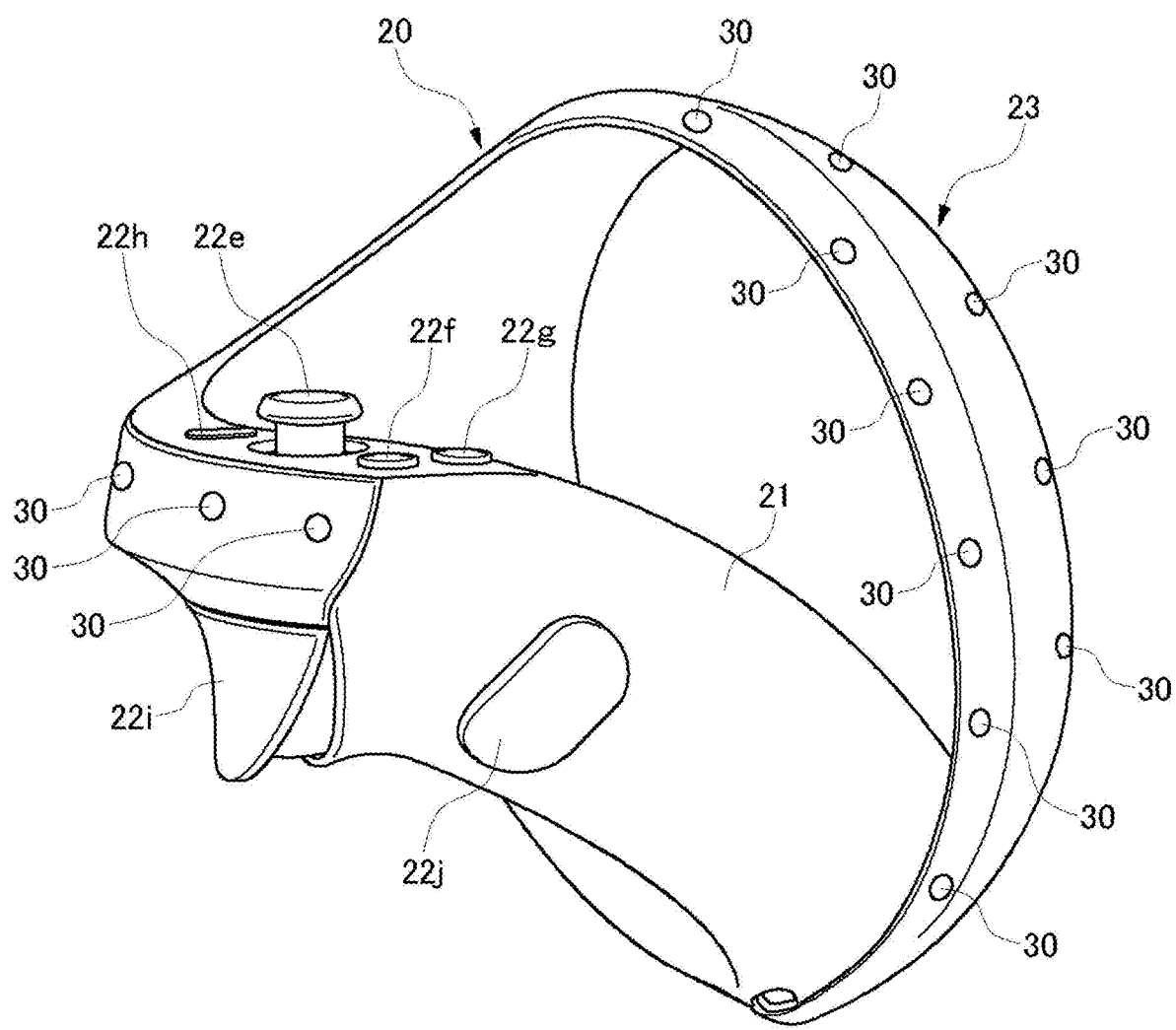
FIG. 5 is a diagram for depicting the shape of the input device.

FIG. 5 depicts the shape of the input device 16b for the right hand. The input device 16b has operation members 22i and 22j in addition to the operation members 22e, 22f, 22g, and 22h depicted in FIG. 4(b). The user operates the operation member 22i by using the index finger of the right hand in a state of gripping the gripping part 21, and operates the operation member 22j by using the middle finger. Hereinafter, in a case where the input device 16a and the input device 16b are not particularly distinguished from each other, they are referred to as an "input devices 16."

The operation members 22 provided in the input device 16 may be equipped with a touch sense function for recognizing a finger only by touching without pressing. With respect to the input device 16b for the right hand, the operation members 22f, 22g, and 22j may include electrostatic capacitive touch sensors. It should be noted that the touch sensors may be mounted on the other operation members 22, but it is preferable that, when the input device 16 is placed on the mounting surface of a table or the like, the touch sensors are mounted on the operation members 22 that do not come into contact with the mounting surface.

The markers 30 are light emission parts that emit light to the outside of the case body 20, and include, on the surface of the case body 20, resin parts for diffusing and emitting light from a light source such as an LED (Light Emitting Diode) element to the outside. The markers 30 are photographed by the imaging apparatuses 14 and used for tracking processing of the input device 16.

The information processing apparatus 10 uses the photographed images by the imaging apparatuses 14 for tracking processing of the input device 16 and SLAM (Simultaneous Localization and Mapping) processing of the HMD 100. In the embodiment, among the images photographed by the imaging apparatuses 14 at 120 frames per second, a grayscale image photographed at 60 frames per second may be used for the tracking processing of the input device 16, and another full-color image photographed at 60 frames per second may be used for processing in which self-position estimation and environmental map creation of the HMD 100 are simultaneously executed.

Figure 6:
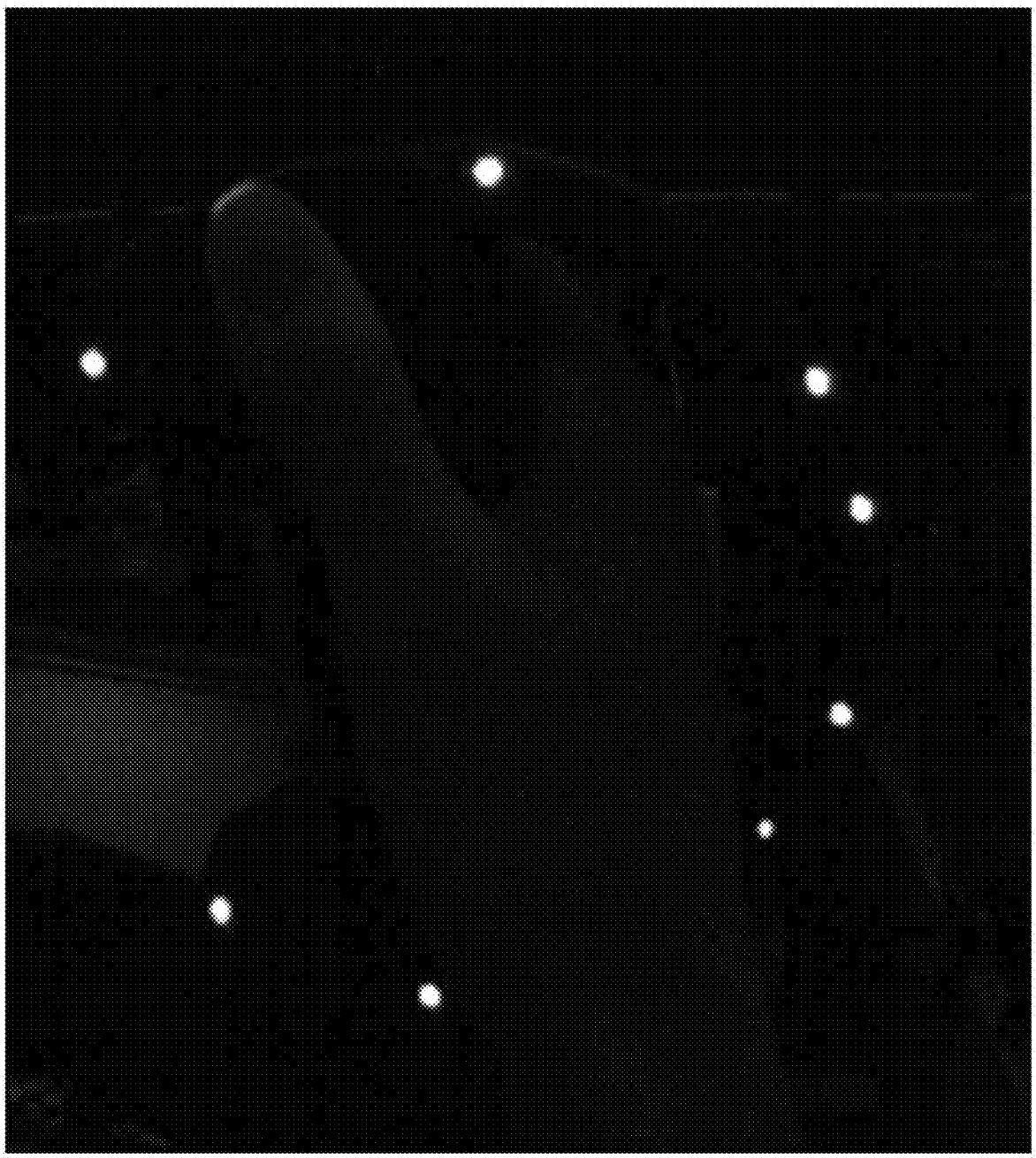
FIG. 6 is a diagram for depicting an example of a part of an image obtained by photographing the input device.

FIG. 6 depicts an example of a part of an image obtained by photographing the input device 16. This image is an image obtained by photographing the input device 16b gripped by the right hand, and includes images of the plurality of markers 30 for emitting light. In the HMD 100, the communication control unit 128 transmits the image data photographed by the imaging apparatuses 14 to the information processing apparatus 10 in real time.

Figure 7:
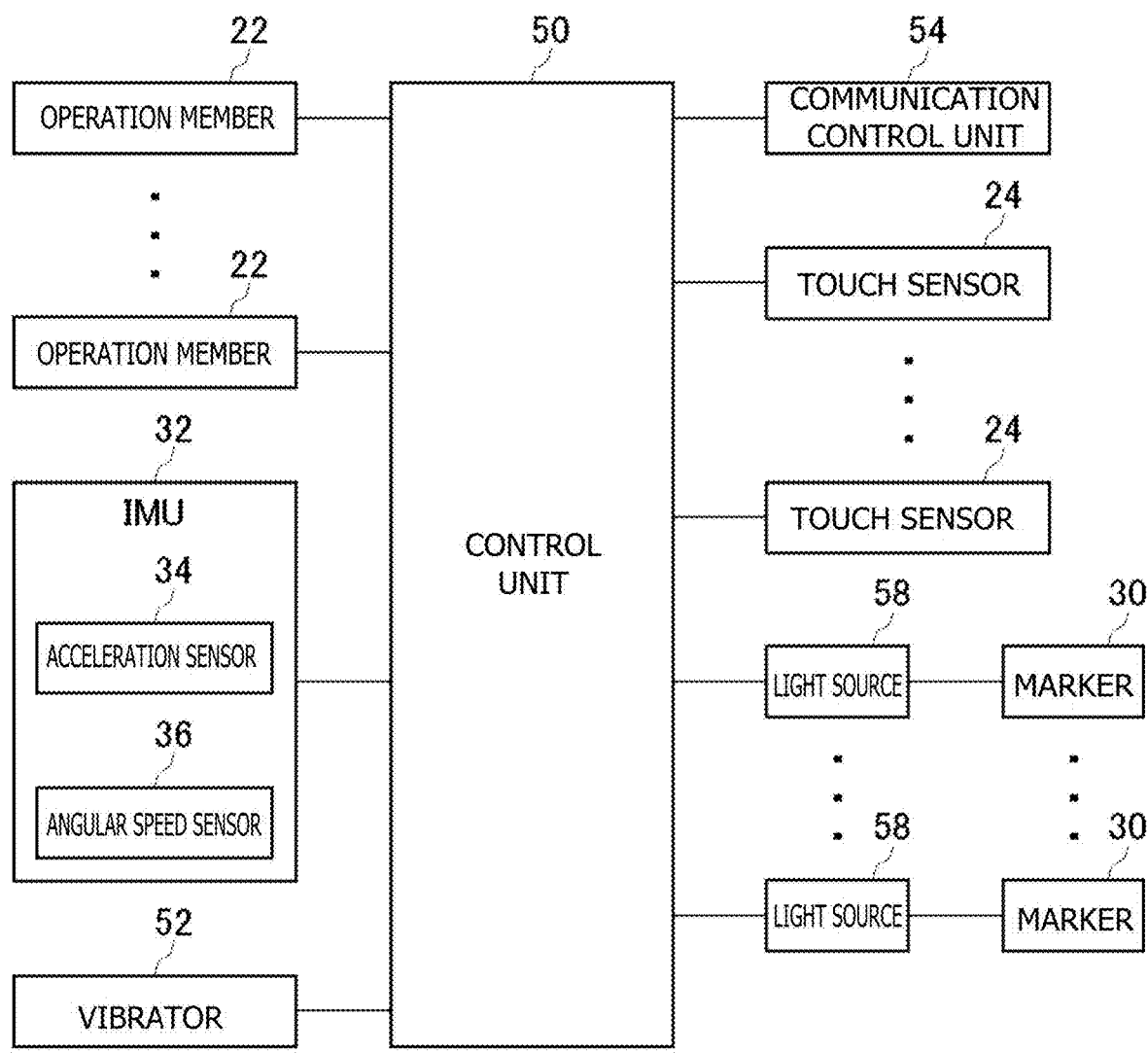
FIG. 7 is a diagram for depicting functional blocks of the input device.

FIG. 7 depicts functional blocks of the input device 16. A control unit 50 accepts the operation information input to the operation members 22. In addition, the control unit 50 accepts the sensor data detected by an IMU (inertial measurement unit) 32 and the sensor data detected by a touch sensor 24. As described above, the touch sensor 24 is attached to at least some of the plurality of operation members 22, and detects a state in which the fingers of the user come into contact with the operation members 22.

The IMU 32 includes an acceleration sensor 34 for acquiring sensor data related to the movement of the input device 16 and detecting acceleration data in at least three axes, and an angular speed sensor 36 for detecting angular speed data in three axes. The acceleration sensor 34 and the angular speed sensor 36 detect the value (sensor data) of each axis component at a predetermined cycle (for example, 800 Hz). The control unit 50 supplies the accepted operation information and sensor data to a communication control unit 54, and the communication control unit 54 transmits the operation information and sensor data to the information processing apparatus 10 by wired or wireless communication via a network adapter or an antenna.

The input device 16 include a plurality of light sources 58 for lighting the plurality of markers 30. The light sources 58 may be LED elements for emitting light in a predetermined color. When the communication control unit 54 acquires a light emission instruction from the information processing apparatus 10, the control unit 50 causes the light sources 58 to emit light on the basis of the light emission instruction and lights the markers 30. In the example depicted in FIG. 7, one light source 58 is provided for one marker 30, but one light source 58 may light the plurality of markers 30.

A vibrator 52 presents a tactile stimulus for game performance to the user. During the game play by the user, the information processing apparatus 10 transmits a vibration instruction to the input device 16 according to the game progress. When the communication control unit 54 acquires the vibration instruction from the information processing apparatus 10, the control unit 50 vibrates the vibrator 52 on the basis of the vibration instruction. The vibrator 52 presents the sense of touch according to the game progress to the user, so that a sense of immersion of the user in the game can be enhanced. The vibrator 52 may be, for example, a voice coil motor.

Figure 8:
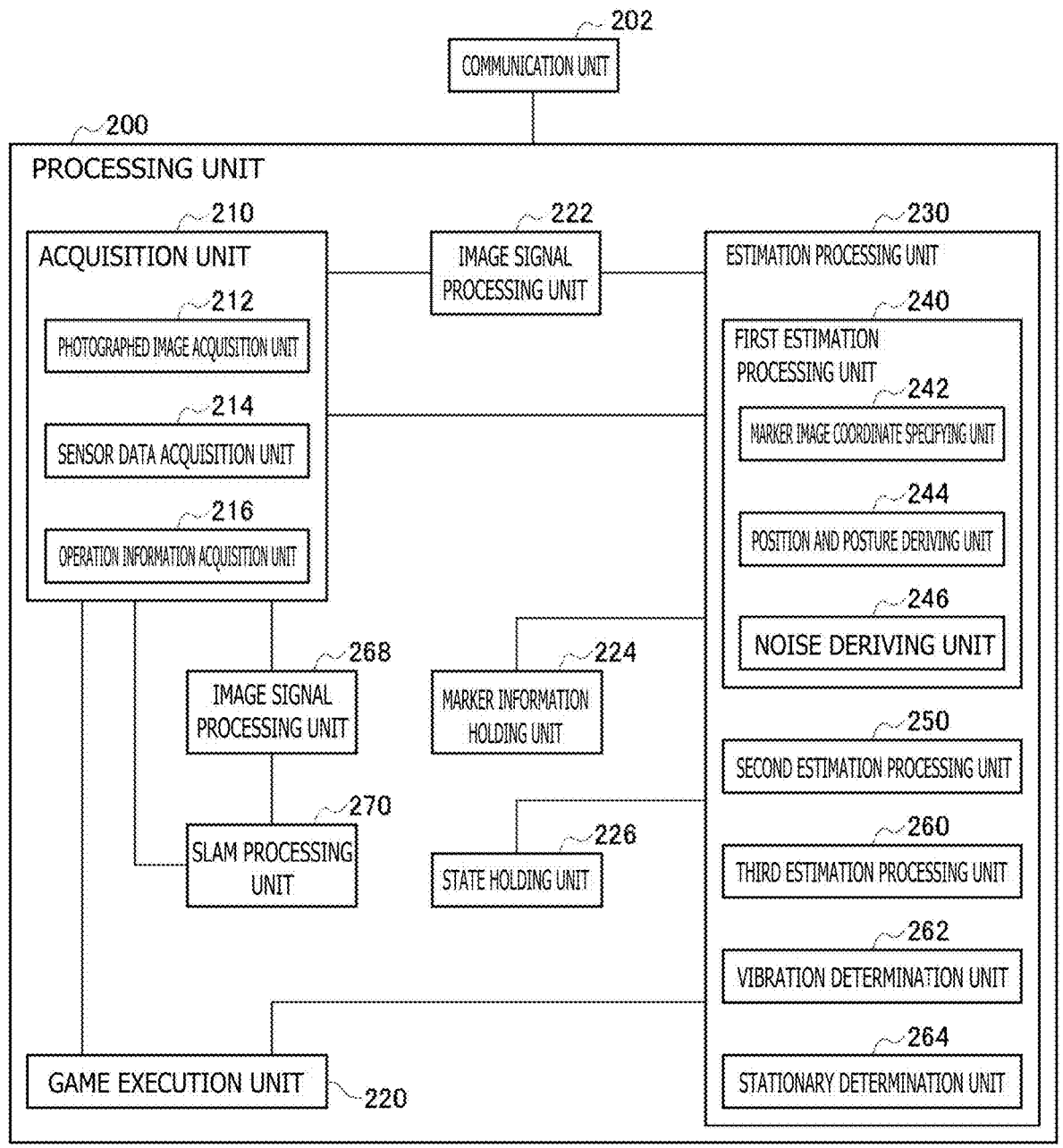
FIG. 8 is a diagram for depicting functional blocks of an information processing apparatus.

FIG. 8 depicts functional blocks of the information processing apparatus 10. The information processing apparatus 10 includes a processing unit 200 and a communication unit 202, and the processing unit 200 includes an acquisition unit 210, a game execution unit 220, an image signal processing unit 222, a marker information holding unit 224, a state holding unit 226, an estimation processing unit 230, an image signal processing unit 268, and a SLAM processing unit 270. The communication unit 202 receives the operation information and sensor data of the operation members 22 transmitted from the input device 16 and supplies them to the acquisition unit 210. In addition, the communication unit 202 receives the photographed image data and sensor data transmitted from the HMD 100 and supplies them to the acquisition unit 210. The acquisition unit 210 includes a photographed image acquisition unit 212, a sensor data acquisition unit 214, and an operation information acquisition unit 216.

The information processing apparatus 10 includes a computer, which executes programs to realize the various functions depicted in FIG. 8. The computer includes, as hardware, a memory for loading a program, one or more processors for executing the loaded program, an auxiliary storage apparatus, and other large-scale integrated circuits (LSIs). The processor is configured with a plurality of electronic circuits including semiconductor integrated circuits and LSIs, and the plurality of electronic circuits may be mounted on one chip or on a plurality of chips. It will be understood by those skilled in the art that the functional blocks depicted in FIG. 8 are realized by the cooperation of hardware and software, and thus, these functional blocks can be realized in various forms by hardware alone, software alone, or a combination thereof.

(SLAM Function)

The photographed image acquisition unit 212 acquires a full-color image for SLAM processing of the HMD 100, and supplies it to the image signal processing unit 268. The image signal processing unit 268 applies image signal processing such as noise reduction and optical correction (shading correction) to image data, and supplies the image data subjected to the image signal processing to the SLAM processing unit 270.

The sensor data acquisition unit 214 acquires the sensor data transmitted from the HMD 100 and supplies it to the SLAM processing unit 270. The SLAM processing unit 270 simultaneously executes self-position estimation and environmental map creation of the HMD 100 on the basis of the image data supplied from the photographed image acquisition unit 212 and the sensor data supplied from the sensor data acquisition unit 214.

(First Estimation Function Using Photographed Image)

The photographed image acquisition unit 212 acquires a grayscale image for tracking processing of the input device 16, and supplies it to the image signal processing unit 222. The image signal processing unit 222 applies image signal processing such as noise reduction and optical correction (shading correction) to image data, and supplies the image data subjected to the image signal processing to a first estimation processing unit 240.

The first estimation processing unit 240 includes a marker image coordinate specifying unit 242, a position and posture deriving unit 244, and a noise deriving unit 246, and realizes the first estimation function for estimating the position and the posture of the input device 16 on the basis of the image obtained by photographing the input device 16. The first estimation processing unit 240 extracts marker images obtained by photographing the plurality of markers 30 of the input device 16 from the photographed image, and estimates the position and the posture of the input device 16 from the arrangement of the extracted marker images. The first estimation processing unit 240 outputs the estimated position and posture of the input device 16 to a third estimation processing unit 260 together with the variance of the noise (error).

(Second Estimation Function Using Sensor Data)

The sensor data acquisition unit 214 acquires the sensor data transmitted from the input device 16 and supplies it to a second estimation processing unit 250. The second estimation processing unit 250 realizes the second estimation function for estimating the speed, the position, and the posture of the input device 16 on the basis of the sensor data indicating the acceleration and the angular speed of the input device 16. In the embodiment, the second estimation function is a function for performing a state prediction step in a Kalman filter, and the second estimation processing unit 250 estimates a state vector at the current time by adding the amount of change in state vector obtained by the integration operation of the supplied sensor data to the state vector (the speed, the position, and the posture) at the previous time. The second estimation processing unit 250 outputs the estimated state vector to the third estimation processing unit 260 together with the variance of the noise. It should be noted that, since the amount of change obtained by the integration operation accumulates noise over time, the state vector (the speed, the position, and the posture) estimated by the second estimation processing unit 250 tends to be separated from the actual state vector (the speed, the position, and the posture).

(Integration Function of Estimation Result)

The third estimation processing unit 260 derives the speed, the position, and the posture of the input device 16 with high accuracy from the position and posture of the input device 16 estimated by the first estimation processing unit 240 and the state vector (the speed, the position, and the posture) of the input device 16 estimated by the second estimation processing unit 250. The third estimation processing unit 260 may perform a filtering step (correction step) of UKF (unscented Kalman filter). The third estimation processing unit 260 acquires the state vector estimated by the second estimation processing unit 250 as a "prior estimation value," acquires the position and the posture estimated by the first estimation processing unit 240 as an "observation value" to calculate a Kalman gain, and obtains an "ex-post estimation value" obtained by correcting the "prior estimation value" by using the Kalman gain. The "ex-post estimation value" expresses the speed, the position, and the posture of the input device 16 with high accuracy, is provided to the game execution unit 220, is recorded in the state holding unit 226, and is used to estimate the state vector at the next time in the second estimation processing unit 250.

The method for enhancing the accuracy by integrating analysis results with use of a plurality of sensors such as the imaging apparatuses 14 and the IMU 32 has been known as sensor fusion. In the sensor fusion, it is necessary to express the time at which data is acquired by each sensor in a common time axis. In the information processing system 1, since the imaging cycle of the imaging apparatuses 14 and the sampling cycle of the IMU 32 are different and asynchronous, the photographing time of the image and the detection time of the acceleration and angular speed are accurately managed, so that the third estimation processing unit 260 can estimate the position and the posture of the input device 16 with high accuracy.

The operation information acquisition unit 216 acquires the operation information transmitted from the input device 16, and supplies it to the game execution unit 220. The game execution unit 220 advances the game on the basis of the operation information and the position and posture information regarding the input device 16 estimated by the estimation processing unit 230.

Figure 9:
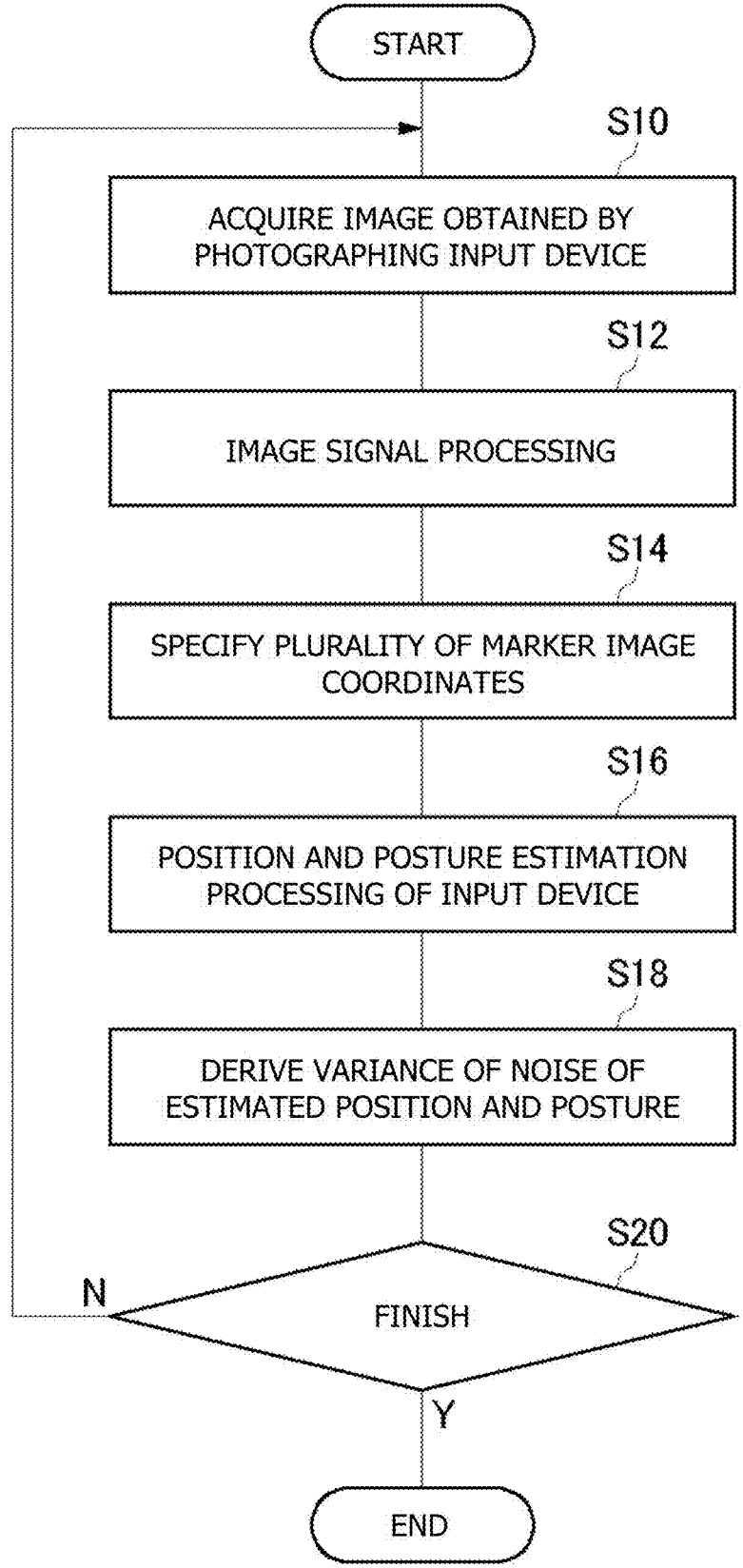
FIG. 9 is a flowchart for depicting position and posture estimation processing.

FIG. 9 is a flowchart for depicting position and posture estimation processing by the first estimation processing unit 240. The photographed image acquisition unit 212 acquires image data obtained by photographing the input device 16 (S10), and supplies it to the image signal processing unit 222. The image signal processing unit 222 applies image signal processing such as noise reduction and optical correction to the image data (S12), and supplies the image data subjected to the image signal processing to the marker image coordinate specifying unit 242.

The marker image coordinate specifying unit 242 specifies the representative coordinate of the plurality of marker images included in the photographed image (S14). In the case where the luminance of each pixel of the grayscale image is expressed in 8 bits and takes a luminance value of 0 to 255, the marker images are photographed as images having high luminance as depicted in FIG. 6. The marker image coordinate specifying unit 242 may specify, from the photographed image, a region where pixels having a luminance value (for example, a luminance value of 128) equal to or larger than a predetermined value are continuous, calculate the barycentric coordinate of the continuous pixel region, and specify the representative coordinate of the marker images.

It should be noted that the photographed image includes not only the marker images but also an image of lighting equipment such as an electric lamp. Therefore, the marker image coordinate specifying unit 242 investigates whether the continuous pixel region having a luminance value equal to or larger than a predetermined value corresponds to the marker images in light of some predetermined standards. For example, in a case where the continuous pixel region is too large or has a long shape, it is certain that the continuous pixel region does not correspond to the marker images, and thus, the marker image coordinate specifying unit 242 may determine that such a continuous pixel region is not the marker images. The marker image coordinate specifying unit 242 calculates the barycentric coordinate of the continuous pixel region satisfying a predetermined standard, specifies it as the representative coordinate (marker image coordinate) of the marker images, and stores the specified representative coordinate in a memory (not illustrated).

The marker information holding unit 224 holds the three-dimensional coordinate of each marker in the three-dimensional model of the input device 16 at the reference position and the reference posture. As a method for estimating the position and the posture of the imaging apparatus obtained by photographing an image of an object whose three-dimensional shape and size have been known from the photographed image, a method for solving the PNP (Perspective n-Point) problem has been known.

In the embodiment, the position and posture deriving unit 244 reads N (N is an integer equal to or larger than three) marker image coordinates from a memory (not illustrated), and estimates the position and posture of the input device 16 from the read N marker image coordinates and the three-dimensional coordinates of N markers in the three-dimensional model of the input device 16. The position and posture deriving unit 244 estimates the position and the posture of the imaging apparatus 14 by using the following (Equation 1), and derives the position and the posture of the input device 16 in a three-dimensional space on the basis of the estimated result.

[Math. 1]

$$s \begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix} \quad \text{(Equation 1)}$$

Here, (u, v) is the marker image coordinate in the photographed image, and (X, Y, Z) is the position coordinate of the marker 30 in a three-dimensional space when the three-dimensional model of the input device 16 is at the reference position and the reference posture. It should be noted that the three-dimensional model is a model which has the shape and size completely identical to the input device 16 and in which the markers are arranged in the same position, and the marker information holding unit 224 holds the three-dimensional coordinate of each marker in the three-dimensional model at the reference position and the reference posture. The position and posture deriving unit 244 reads the three-dimensional coordinate of each marker from the marker information holding unit 224 to acquire (X, Y, Z).

In addition, ($f_x$, $f_y$) is the focal length of the imaging apparatus 14, and ($c_x$, $c_y$) is the image principal point, both of which are internal parameters of the imaging apparatus 14. A matrix whose elements are $r_{11}$ to $r_{33}$ and $t_1$ to $t_3$ is a rotation and translation matrix. In (Equation 1), (u, v), ($f_x$, $f_y$), ($c_x$, $c_y$), and (X, Y, Z) are known, and the position and posture deriving unit 244 solves the equations for the N markers 30 to obtain a common rotation and translation matrix. In the embodiment, the processing of estimating the position and the posture of the input device 16 is performed by solving the P3P problem.

Specifically, the position and posture deriving unit 244 extracts desired three marker image coordinates from the plurality of marker image coordinates specified by the marker image coordinate specifying unit 242. The position and posture deriving unit 244 reads the three-dimensional coordinates of the markers in the three-dimensional model from the marker information holding unit 224, and solves the P3P problem by using (Equation 1). When specifying the rotation and translation matrix common to the extracted three marker image coordinates, the position and posture deriving unit 244 calculates a reprojection error by using the marker image coordinates of the input device 16 other than the extracted three marker image coordinates.

The position and posture deriving unit 244 extracts a predetermined number of combinations of three marker image coordinates. The position and posture deriving unit 244 specifies the rotation and translation matrix for each combination of the extracted three marker image coordinates, and calculates the respective reprojection errors. Then, the position and posture deriving unit 244 specifies the rotation and translation matrix serving as the minimum reprojection error from a predetermined number of reprojection errors, and derives the position and posture of the input device 16 (S16).

The noise deriving unit 246 derives the variance of noise (error) of each of the estimated position and posture (S18). The variance value of the noise corresponds to the reliability of the estimated position and posture, and the variance value becomes smaller as the reliability is higher, and the variance value becomes larger as the reliability is lower. The noise deriving unit 246 may derive the variance of the noise on the basis of the distance between the imaging apparatus 14 and the input device 16, and the position of the marker image within the angle of view. For example, in a case where the imaging apparatus 14 and the input device 16 are far apart from each other or extremely close to each other, or in the case where the marker image is located at the edge of the photographed image, it becomes difficult to accurately derive the barycentric coordinate of the marker images, and thus, the noise variance tends to be largely derived.

The position and posture estimation processing by the first estimation processing unit 240 is performed at an imaging cycle (60 frames per second) of the tracking image of the input device 16 (N in S20). When the game execution unit 220 finishes the game, the position and posture estimation processing by the first estimation processing unit 240 finishes (Y in S20).

Figure 10:
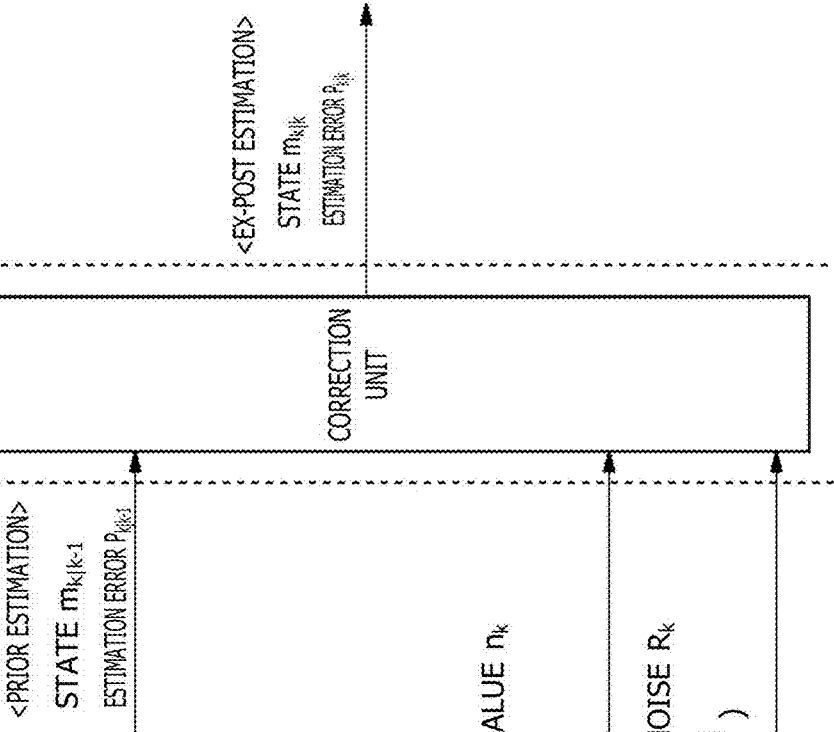
FIG. 10 is a diagram for depicting an internal configuration of an estimation processing unit.

FIG. 10 depicts an internal configuration of the estimation processing unit 230. At time k, the first estimation processing unit 240 outputs the estimated position and posture as "observation value n" and the variance of the position noise and posture noise as "observation noise $R_k$" to the third estimation processing unit 260.

Observation value $n_k$: observation vector at time k

Observation noise $R_k$: error covariance matrix of observation value at time k

The second estimation processing unit 250 reads "state vector $m_{k-1|k-1}$" and "estimation error $P_{k-1|k-1}$" at the time one unit time ago (time k−1) from the state holding unit 226, and inputs the "state vector $m_{k-1|k-1}$" and "estimation error $P_{k-1|k-1}$" to a prediction unit. The state variable m in the embodiment includes the speed, the position, and the posture of the input device 16, but may further include the acceleration bias and angular speed bias.

State vector $m_{k-1|k-1}$: state vector at time k−1 estimated using information up to time k−1

Estimation error $P_{k-1|k-1}$: estimation error covariance matrix of the state at time k−1 estimated using information up to time k−1

In addition, the second estimation processing unit 250 acquires the acceleration ax and the angular speed $\omega_k$ of the input device 16 from the sensor data acquisition unit 214, and inputs the acceleration ax and the angular speed $\omega_k$ as "process input $l_k$" to the prediction unit.

Acceleration $a_k$: acceleration at time k

Angular speed $\omega x$: angular speed at time k

Process input $l_k$: process input vector at time k

The second estimation processing unit 250 calculates the variance of the acceleration noise and the variance of the angular speed noise from the acceleration ax, the angular speed $\omega_k$, and a fixed noise parameter (including axis deviation, scale deviation, value deviation, and bias deviation), and inputs them as "process noise $Q_k$" to the prediction unit.

Process noise $Q_k$: error covariance matrix of process input at time k

The prediction unit performs an integration operation for each of the acceleration ax and the angular speed $\omega_k$ to calculate the amount of change (that is, the amount of change in speed, the amount of change in position, and the amount of change in posture) from "state vector $M_{k-1|k-1}$," and performs an operation to add it to "state vector $m_{k-1|k-1}$." Specifically, the prediction unit calculates the amount of change in speed by integrating the acceleration ax, adds the calculated amount of change in speed to the speed at time k−1 included in "state vector $m_{k-1|k-1}$," and estimates the speed at time k. The prediction unit calculates the amount of change in position by integrating the estimated speed at time k, adds the calculated amount of change in position to the position at time k−1 included in "state vector $m_{k-1|k-1}$," and estimates the position at time k. The prediction unit calculates the amount of change in posture by integrating the angular speed $\omega_k$, adds the calculated amount of change in posture to the posture at time k−1 included in "state vector $m_{k-1|k-1}$," and estimates the posture at time k. As described above, the prediction unit calculates "state vector $m_{k|k-1}$." The prediction unit outputs "state vector $m_{k|k-1}$" and "estimation error $P_{k|k-1}$" to the third estimation processing unit 260.

State vector $m_{k|k-1}$: state vector at time k estimated using information up to time k−1

Estimation error $P_{k|k-1}$: estimation error covariance matrix of the state at time k estimated using information up to time k−1

The third estimation processing unit 260 acquires "observation value n" and "observation noise $R_k$" from the first estimation processing unit 240, acquires "state vector $m_{k|k-1}$" and "estimation error $P_{k|k-1}$" from the second estimation processing unit 250, and calculates the Kalman gain for correcting "state vector $m_{k|k-1}$." The third estimation processing unit 260 corrects "state vector $m_{k|k-1}$" by using the Kalman gain and outputs "state vector $m_{k|k}$" and "estimation error $P_{k|k}$."

State vector $m_{k|k}$: state vector at time k estimated using information up to time k Estimation error $P_{k|k}$: estimation error covariance matrix of the state at time k estimated using information up to time k The "state vector $m_{k|k}$" indicates the speed, the position, and the posture estimated with high accuracy and may be provided to the game execution unit 220 for use in game operations. The "state vector $m_{k|k}$" and "estimation error $P_{k|k}$" are temporarily held in the state holding unit 226 and read during the estimation processing at time k+1 in the second estimation processing unit 250.

In the estimation processing unit 230, the estimation processing by the first estimation processing unit 240 is performed at a cycle of 60 Hz, while the estimation processing by the second estimation processing unit 250 is performed at a cycle of 800 Hz. Therefore, the second estimation processing unit 250 sequentially updates the state vector between the time when the first estimation processing unit 240 outputs the observation value and the time when the next observation value is output, and the state vector is not corrected during this time. The estimation processing unit 230 of the embodiment performs a correction step on the basis of the state at the time k−1 immediately before the observation time k, that is, the observation value is used to correct the past state.

As described above, while the tracking processing of the input device 16 is performed, the estimation processing unit 230 estimates the position and posture of the input device 16 with high accuracy. However, when the markers 30 of the input device 16 are not photographed by the imaging apparatus 14, the first estimation processing unit 240 cannot execute the position and posture estimation processing depicted in FIG. 9.

Figure 11:
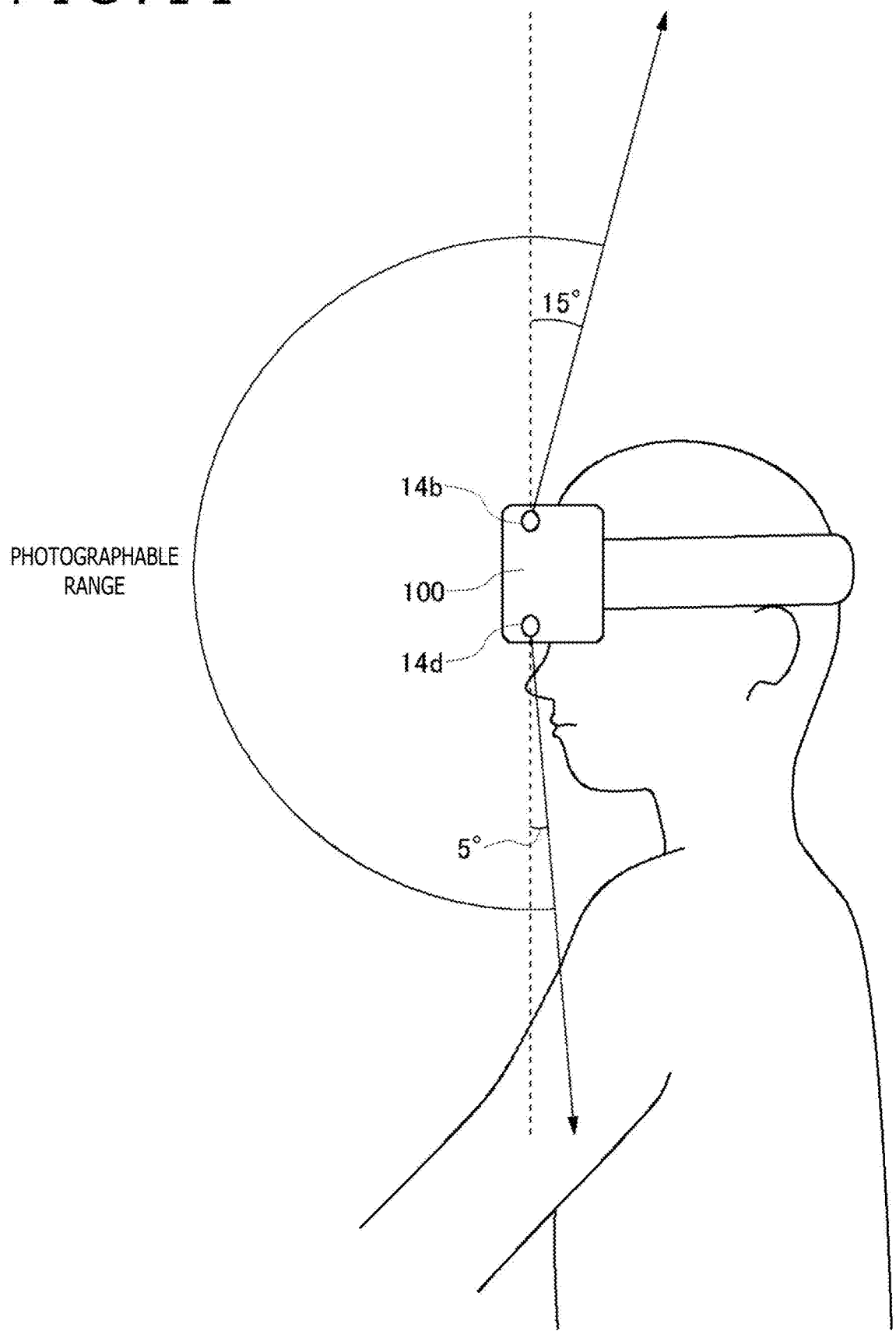
FIG. 11 is a diagram for schematically depicting a photographable range of an imaging apparatus.

FIG. 11 schematically depicts a photographable range of the imaging apparatus 14 mounted on the HMD 100. Since the imaging apparatus 14 is attached to the front side of the HMD 100, the space on the front side of the HMD 100 can be photographed, but the space on the rear side cannot be photographed. Therefore, when the user moves the input device 16 to the rear of the face, the input device 16 deviates from the angle of view of the imaging apparatus 14, and thus, the position and posture estimation processing depicted in FIG. 9 cannot be executed.

Figure 12:
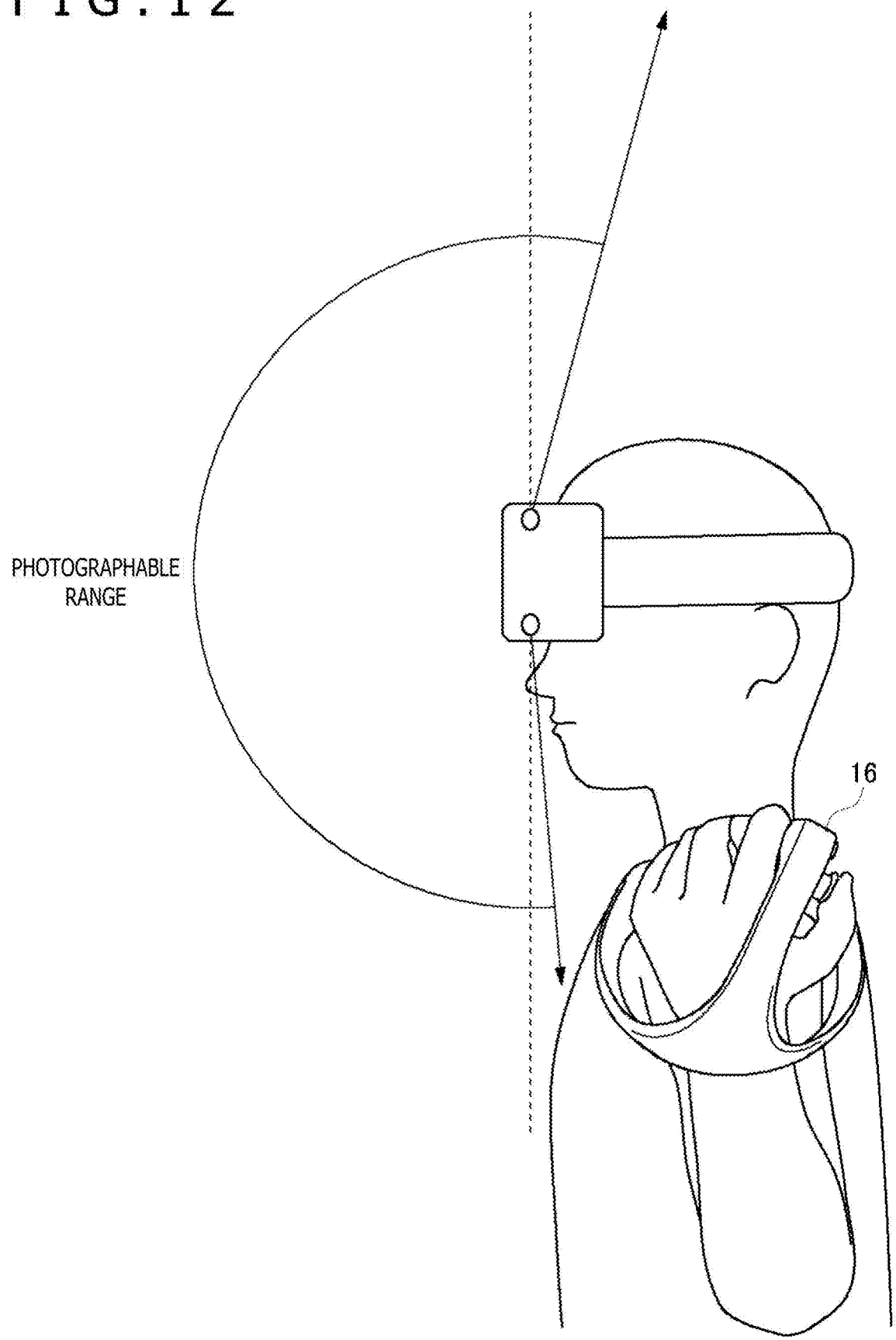
FIG. 12 is a diagram for depicting a state in which the input device deviates from the photographable range.

FIG. 12 depicts a state in which the input device 16 deviates from the photographable range of the imaging apparatus 14. In this example, the user moves the input device 16 to the side of the face, so that the input device 16 deviates from the angle of view of the imaging apparatus 14. At this time, the marker images are not included in the photographed image, and the marker image coordinate specifying unit 242 cannot extract the marker images from the photographed image.

As described above, the second estimation processing unit 250 calculates the amount of change in speed by integrating the acceleration ax at time k, adds the calculated amount of change in speed to the estimated speed at time k−1, and estimates the speed at time k. Then, the second estimation processing unit 250 calculates the amount of change in position by integrating the estimated speed at time k, adds the calculated amount of change in position to the estimated position at time k−1, and estimates the position at time k. Integral drift is mixed in the estimated speed and position at time k, the amount of drift is accumulated every time the integration operation is repeated, and thus in the estimation processing unit 230 of the embodiment, the third estimation processing unit 260 corrects the state vector (the speed, the position, and the posture) output by the second estimation processing unit 250 by using an "observation value $n_k$" with high reliability at the tracking processing cycle (60 Hz) in the first estimation processing unit 240.

However, when the first estimation processing unit 240 cannot execute the tracking processing, the "observation value $n_k$" cannot be input to the third estimation processing unit 260, and the third estimation processing unit 260 cannot correct the state vector output by the second estimation processing unit 250. As the period of time during which the tracking processing cannot be performed becomes longer, the estimated state vector is largely separated from the true state vector, but this is not such a serious problem in normal gameplay because the user moves the input device 16 forward in a short time and the photographing of the input device 16 resumes.

However, if the vibrator 52 is vibrated by the game performance during a period of time during which the input device 16 is not photographed, the acceleration sensor 34 detects a large acceleration due to the vibration of the vibrator 52. Therefore, when the acceleration sensor 34 detects a large acceleration even though the user keeps the input device 16 stationary on the side of the face, the second estimation processing unit 250 calculates a large amount of change in speed and a large amount of change in position.

FIG. 13(a) depicts time series data of the acceleration detected during vibration of the vibrator 52. When the acceleration is measured, the input device 16 is in a stationary state, and the acceleration sensor 34 measures the acceleration due to the vibration of the vibrator 52 at a cycle of 800 Hz.

FIG. 13(b) depicts a change in speed estimated using the acceleration depicted in FIG. 13(a), and FIG. 13(c) depicts a change in position estimated using the speed depicted in FIG. 13(b).

Since the input device 16 is stationary, the speed of the input device 16 is ideally estimated to be 0, but since the second estimation processing unit 250 estimates the speed on the basis of the acceleration, the estimated speed drifts as depicted in FIG. 13(b), and thus, the estimated position also drifts as depicted in FIG. 13(c). Therefore, in a case where the execution of the tracking processing of the input device 16 by the first estimation processing unit 240 becomes impossible, the second estimation processing unit 250 of the embodiment performs attenuation processing to suppress the drift at the estimated speed and position on the condition that the vibrator 52 is vibrating and the input device 16 is in a stationary state.

Figure 14:
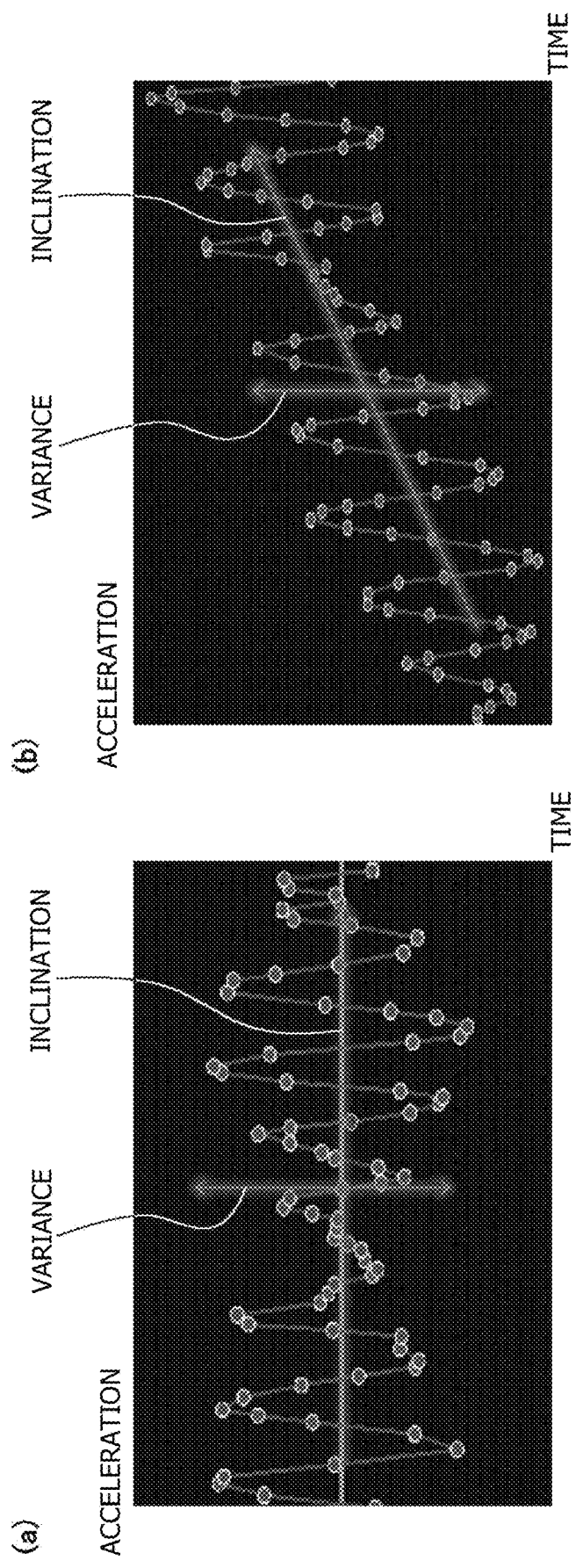
FIG. 14 depicts diagrams each depicting a variance and an inclination of the acceleration calculated from the time series data of the acceleration.

FIG. 14(a) depicts time series data of the acceleration detected when the vibrator 52 vibrates and the input device 16 is stationary. A vibration determination unit 262 determines whether or not the vibrator 52 is vibrating on the basis of the sensor data indicating the acceleration. As depicted in FIG. 14(a), since the acceleration measured during the vibration of the vibrator 52 largely fluctuates, the variance of the time series data of the acceleration indicates a large value. Therefore, the vibration determination unit 262 calculates the variance from the time series data of the acceleration, and determines whether or not the vibrator 52 is vibrating on the basis of the calculated variance.

The vibration determination unit 262 of the embodiment calculates, as the variance, a value obtained by squaring the deviations (differences between respective sampling values and an average sampling value) of 100 acceleration values from the current time t to the past time (t−99) and averaging the squared deviations of 100 values. It should be noted that the number of samples used for calculating the variance may be other than 100. The vibration determination unit 262 may calculate the variance at the sampling cycle of the sensor data and always determine whether or not the vibrator 52 is vibrating.

When the calculated variance is equal to or larger than a predetermined threshold value Vth, the vibration determination unit 262 determines that the vibrator 52 is vibrating, and when the calculated variance is less than the threshold value Vth, it is determined that the vibrator 52 is not vibrating. The vibration determination unit 262 determines that the vibrator 52 is vibrating by confirming that the variance calculated from the time series data of the acceleration depicted in FIG. 14(a) is equal to or larger than the threshold value Vth. It should be noted that, in order to prevent the determination results from being frequently exchanged, the vibration determination unit 262 may determine that the vibrator 52 is vibrating when the calculated variance continuously becomes the threshold value Vth or larger for a predetermined number of times ($N_1$ times), and after the determination of the vibration, it may be determined that the vibrator 52 is not vibrating when the calculated variance continuously becomes less than the threshold value Vth for a predetermined number of times ($N_2$ times). $N_1$ and $N_2$ may be the same number of times, but may be different numbers of times.

The stationary determination unit 264 determines whether or not the input device 16 is stationary on the basis of the sensor data indicating the acceleration. The stationary determination unit 264 calculates the inclination of the acceleration from the time series data of the acceleration, and determines whether or not the input device 16 is stationary on the basis of the calculated inclination.

The stationary determination unit 264 of the embodiment obtains a regression line by applying the least squares method to 100 acceleration values from the current time t to the past time (t-99), and specifies the inclination thereof. It should be noted that the number of samples used for calculating the inclination may be other than 100. The stationary determination unit 264 may calculate the inclination at the sampling cycle of the sensor data and always determine whether or not the input device 16 is stationary.

The stationary determination unit 264 determines that the input device 16 is moving when the absolute value of the calculated inclination is equal to or larger than a predetermined threshold value Sth, and determines that the input device 16 is stationary when the absolute value of the calculated inclination is less than the threshold value Sth. The stationary determination unit 264 determines that the input device 16 is stationary by confirming that the inclination calculated from the time series data of the acceleration depicted in FIG. 14(a) is less than the threshold value Sth. It should be noted that, in order to prevent the determination results from being frequently exchanged, the vibration determination unit 262 may determine that the input device 16 is stationary when the absolute value of the calculated inclination continuously becomes less than the threshold value Sth for a predetermined number of times ($N_3$ times), and after the determination of the stationary, it may be determined that the input device 16 is moving when the absolute value of the calculated inclination continuously becomes the threshold value Sth or more for a predetermined number of times ($N_4$ times). $N_3$ and $N_4$ may be the same number of times, but may be different numbers of times.

FIG. 14(b) depicts time series data of the acceleration detected when the vibrator 52 is vibrating and the input device 16 is moving. The vibration determination unit 262 determines that the vibrator 52 is vibrating by confirming that the variance calculated from the time series data of the acceleration depicted in FIG. 14(b) is equal to or larger than the threshold value Vth.

When being compared with the time series data of the acceleration depicted in FIG. 14(a), the time series data of the acceleration depicted in FIG. 14(b) depicts a tendency to increase gradually. The stationary determination unit 264 determines that the input device 16 is moving by confirming that the absolute value of the inclination calculated from the time series data of the acceleration depicted in FIG. 14(b) is equal to or larger than the threshold value Sth.

In a case where the execution of the tracking processing of the input device 16 by the first estimation processing unit 240 becomes impossible, when the vibration determination unit 262 determines that the vibrator 52 is vibrating and the stationary determination unit 264 determines that the input device 16 is stationary, the second estimation processing unit 250 performs attenuation processing to reduce the estimated speed of the input device 16. In this attenuation processing, the stationary determination unit 264 multiplies the speed included in the "state vector $m_{k|k-1}$" by a predetermined attenuation coefficient c (0<c<1) to perform an operation for reducing the estimated speed. In the embodiment, the attenuation coefficient c is 0.99, but may be other fixed values. The stationary determination unit 264 can suppress the drift of the speed and the position by performing the attenuation processing to reduce the estimated speed.

Figure 15:
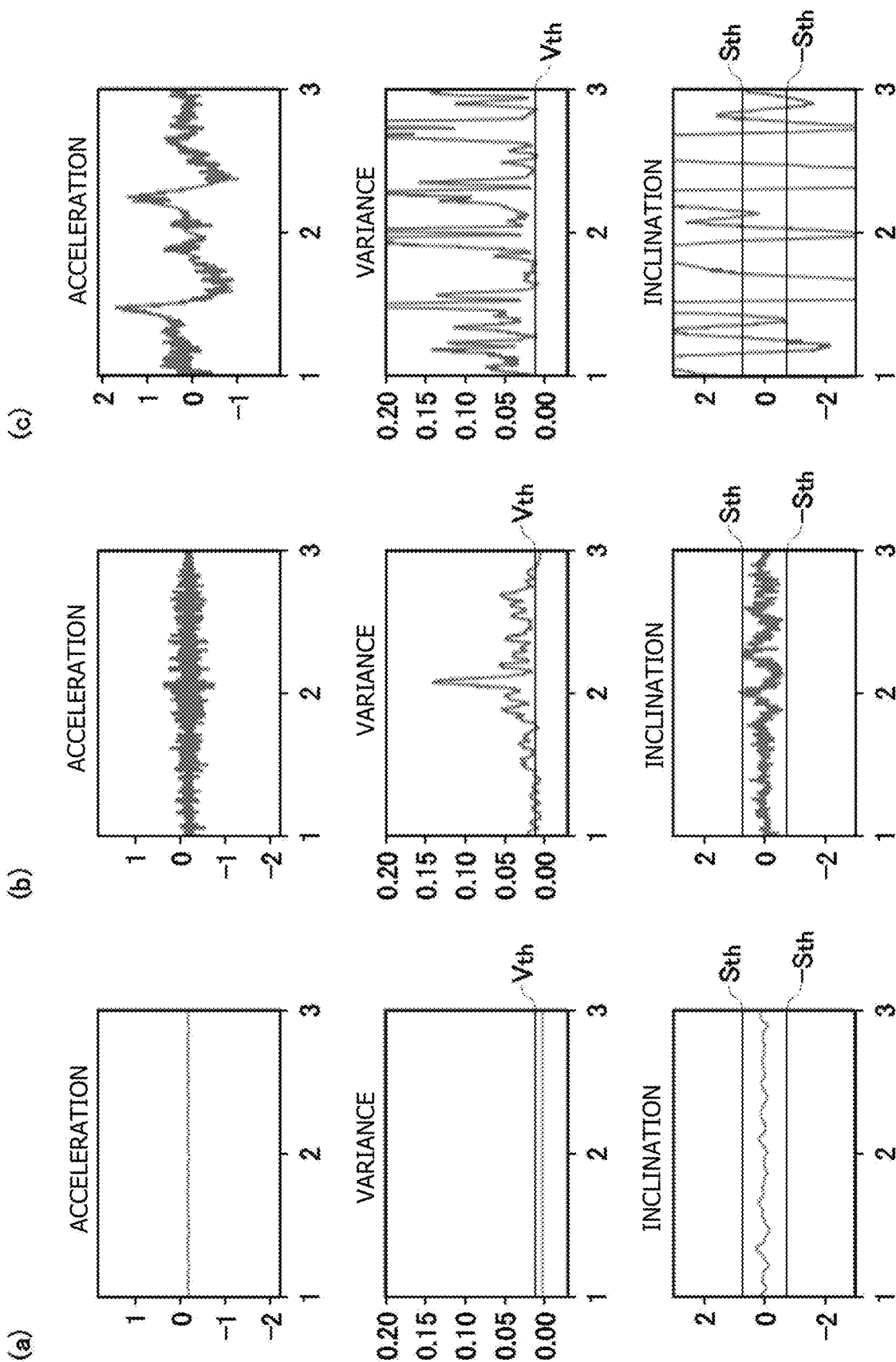
FIG. 15 depicts diagrams for explaining the relation between time series data of the acceleration, a change in variance, and a change in inclination.

FIG. 15 depicts diagrams for explaining the relation between the time series data of the acceleration, a change in variance, and a change in inclination. In the graph depicting a change in variance, variance values calculated from the last 100 pieces of acceleration data are arranged on the time axis, and in the graph depicting a change in inclination, inclinations calculated from the last 100 pieces of acceleration data are arranged on the time axis.

FIG. 15(a) depicts time series data of the acceleration detected when the vibrator 52 is not vibrating and the input device 16 is stationary, a change in the calculated variance, and a change in the calculated inclination. The vibration determination unit 262 determines that the vibrator 52 is not vibrating because the calculated variance is less than the threshold value Vth. In addition, the stationary determination unit 264 determines that the input device 16 is stationary because the absolute value of the calculated inclination is less than the threshold value Sth.

FIG. 15(b) depicts time series data of the acceleration detected when the vibrator 52 is vibrating and the input device 16 is stationary, a change in the calculated variance, and a change in the calculated inclination. The vibration determination unit 262 determines that the vibrator 52 is vibrating because the calculated variance is equal to or larger than the threshold value Vth. It should be noted that the vibration determination unit 262 may determine that the vibrator 52 is not vibrating when the calculated variance becomes less than the threshold value Vth, and after the determination of the vibration, it may be determined that the vibrator 52 is not vibrating when the calculated variance continuously becomes less than the threshold value Vth for a predetermined number of times ($N_2$ times) as described above. The stationary determination unit 264 determines that the input device 16 is stationary because the absolute value of the calculated inclination is less than the threshold value Sth.

FIG. 15(c) depicts time series data of the acceleration detected when the vibrator 52 is vibrating and the input device 16 is moving, a change in the calculated variance, and a change in the calculated inclination. The acceleration depicted in FIG. 15(c) is the acceleration detected when the user is shaking the input device 16. The vibration determination unit 262 determines that the vibrator 52 is vibrating because the calculated variance is equal to or larger than the threshold value Vth. In addition, the stationary determination unit 264 determines that the input device 16 is moving because the absolute value of the calculated inclination is equal to or larger than the threshold value Sth. It should be noted that the vibration determination unit 262 may determine that the input device 16 is stationary when the absolute value of the calculated inclination becomes less than the threshold value Sth, but after the determination of the moving, it may be determined that the input device 16 is stationary when the absolute value of the calculated inclination continuously becomes less than the threshold value Sth for a predetermined number of times.

As depicted in FIG. 15(b), in a case where it is determined by the vibration determination unit 262 that the vibrator 52 is vibrating and it is simultaneously determined by the stationary determination unit 264 that the input device 16 is stationary, the second estimation processing unit 250 performs attenuation processing to reduce the estimated speed of the input device 16. When a state in which the vibrator 52 is vibrating and the input device 16 stationary continues, the second estimation processing unit 250 continues to multiply the estimated speed by the coefficient c at a cycle of 800 Hz, so that the estimated speed gradually approaches 0.

FIG. 16(a) depicts time series data of the acceleration detected when the vibrator 52 is vibrating and the input device 16 is stationary.

FIG. 16(b) depicts a change in the estimated speed subjected to the attenuation processing. The estimated speed attenuates over time by the attenuation processing and approaches 0.

FIG. 16(c) depicts a change in position estimated on the basis of the estimated speed. Since the second estimation processing unit 250 estimates the position on the basis of the attenuated estimated speed, the estimated position does not drift. In a state where the vibrator 52 is vibrating and the input device 16 is stationary in a case where the tracking processing by the first estimation processing unit 240 cannot be performed as described above, the second estimation processing unit 250 can estimate a stable position by performing the attenuation processing for the estimated speed. It should be noted that the second estimation processing unit 250 performs the attenuation processing in a case where the tracking processing is not performed, and if the tracking processing is performed, there is no need to perform the attenuation processing.

It should be noted that, when the input device 16 moves into the angle of view of the imaging apparatus 14 and the marker images are included in the photographed image, the marker image coordinate specifying unit 242 extracts the marker images from the photographed image, and the position and posture deriving unit 244 resumes the position and posture estimation processing on the basis of the marker images. After the first estimation processing unit 240 resumes the tracking processing, the second estimation processing unit 250 may stop the execution of the attenuation processing.

The present disclosure has been described above on the basis of the embodiment. It will be understood by those skilled in the art that the above-described embodiment is illustrative and that various modified examples are possible for combinations of the constitutional elements and the processing processes, and that such modified examples are also within the scope of the present disclosure. Although the information processing apparatus 10 performs the estimation processing in the embodiment, the function of the information processing apparatus 10 may be provided in the HMD 100, and the HMD 100 may perform the estimation processing. That is, the HMD 100 may be the information processing apparatus 10.

Although the arrangement of the plurality of markers 30 in the input device 16 including the operation members 22 has been described in the embodiment, the device to be tracked does not necessarily have to include the operation members 22. Although the imaging apparatus 14 is attached to the HMD 100 in the embodiment, the imaging apparatus 14 may be attached to another position other than the HMD 100 as long as the marker images can be photographed.

INDUSTRIAL APPLICABILITY

The present disclosure can be used for a technical field for estimating a speed and/or a position of a device including a vibrator.

REFERENCE SIGNS LIST

1: Information processing system
10: Information processing apparatus
14: Imaging apparatus
16, 16a, 16b: Input device
20: Case body
21: Gripping part
22: Operation member
23: Curved part
24: Touch sensor
30: Marker
32: IMU
34: Acceleration sensor
36: Angular speed sensor
50: Control unit
52: Vibrator
54: Communication control unit
58: Light source
100: HMD
102: Output mechanism unit
104: Wearing mechanism unit
106: Wearing band
108: Housing
120: Control unit
122: Storage unit
124: IMU
126: Microphone
128: Communication control unit
130: Display panel
130a: Display panel for left eye
130b: Display panel for right eye
132: Sound output unit
200: Processing unit
202: Communication unit
210: Acquisition unit
212: Photographed image acquisition unit
214: Sensor data acquisition unit
216: Operation information acquisition unit
220: Game execution unit
222: Image signal processing unit
224: Marker information holding unit
226: State holding unit
230: Estimation processing unit
240: First estimation processing unit
242: Marker image coordinate specifying unit
244: Position and posture deriving unit
246: Noise deriving unit
250: Second estimation processing unit
260: Third estimation processing unit
262: Vibration determination unit
264: Stationary determination unit
268: Image signal processing unit
270: SLAM processing unit

The invention claimed is:

1. An information processing apparatus that estimates a speed of a device including a vibrator, the apparatus comprising:
a sensor data acquisition unit that acquires sensor data indicating an acceleration of the device;
an estimation processing unit that estimates the speed of the device on a basis of the sensor data;
a vibration determination unit that determines whether or not the vibrator is vibrating on the basis of the sensor data; and
a stationary determination unit that determines whether or not the device is stationary on the basis of the sensor data,
wherein, in a case where it is determined that the vibrator is vibrating and the device is stationary, the estimation processing unit reduces the estimated speed of the device.

2. The information processing apparatus according to claim 1, wherein the vibration determination unit determines whether or not the vibrator is vibrating on a basis of a variance calculated from time series data of the acceleration.

3. The information processing apparatus according to claim 1, wherein the stationary determination unit determines whether or not the device is stationary on a basis of an inclination of the acceleration calculated from the time series data of the acceleration.

4. The information processing apparatus according to claim 1, wherein, in a case where it is determined that the vibrator is vibrating and the device is stationary, the estimation processing unit multiplies the estimated speed of the device by a predetermined attenuation coefficient c ($0<c<1$).

5. The information processing apparatus according to claim 1, wherein the estimation processing unit estimates the speed of the device at a cycle at which the sensor data acquisition unit acquires the sensor data.

6. An information processing apparatus that estimates a position of a device including a vibrator, the apparatus comprising:
    a photographed image acquisition unit that acquires an image obtained by photographing the device;
    a first estimation processing unit that estimates the position of the device on a basis of the image obtained by photographing the device;
    a sensor data acquisition unit that acquires sensor data indicating an acceleration of the device;
    a second estimation processing unit that estimates a speed and the position of the device on a basis of the sensor data;
    a third estimation processing unit that derives the position of the device on a basis of the position of the device estimated by the first estimation processing unit and the position of the device estimated by the second estimation processing unit;
    a vibration determination unit that determines whether or not the vibrator is vibrating on the basis of the sensor data; and
    a stationary determination unit that determines whether or not the device is stationary on the basis of the sensor data,
    wherein, in a case where it is determined that the vibrator is vibrating and the device is stationary, the second estimation processing unit reduces the estimated speed of the device.

7. The information processing apparatus according to claim 6, wherein the second estimation processing unit does not reduce the estimated speed of the device when the device is included in the photographed image, and reduces the estimated speed of the device when the device is not included in the photographed image.

8. A device speed estimation method that is a method for estimating a speed of a device including a vibrator, the method comprising:
    acquiring sensor data indicating an acceleration of the device;
    estimating the speed of the device on a basis of the sensor data;
    determining whether or not the vibrator is vibrating on the basis of the sensor data;
    determining whether or not the device is stationary on the basis of the sensor data; and
    reducing the estimated speed of the device in a case where it is determined that the vibrator is vibrating and the device is stationary.

9. A device position estimation method that is a method for estimating a position of a device including a vibrator, the method comprising:
    acquiring an image photographed by an imaging apparatus;
    first estimating the position of the device on a basis of an image obtained by photographing the device by the imaging apparatus;
    acquiring sensor data indicating an acceleration of the device;
    second estimating a speed and the position of the device on a basis of the sensor data;
    third estimating the position of the device on a basis of the position of the device estimated in the first estimating and the position of the device estimated in the second estimating;
    determining whether or not the vibrator is vibrating on the basis of the sensor data;
    determining whether or not the device is stationary on the basis of the sensor data; and
    reducing the speed of the device estimated in the second estimating in a case where it is determined that the vibrator is vibrating and the device is stationary.

* * * * *